Aug. 7, 1962 A. J. BURMEISTER ETAL 3,048,123
AUTOMATIC DISPATCH CONVEYOR SYSTEMS
Filed June 20, 1957 11 Sheets-Sheet 1

INVENTORS,
Albert J. Burmeister,
Willard D. Brown, Jr.,
Del J. Heidinger,
By Brown, Jackson,
Boettcher & Dienner
Attys

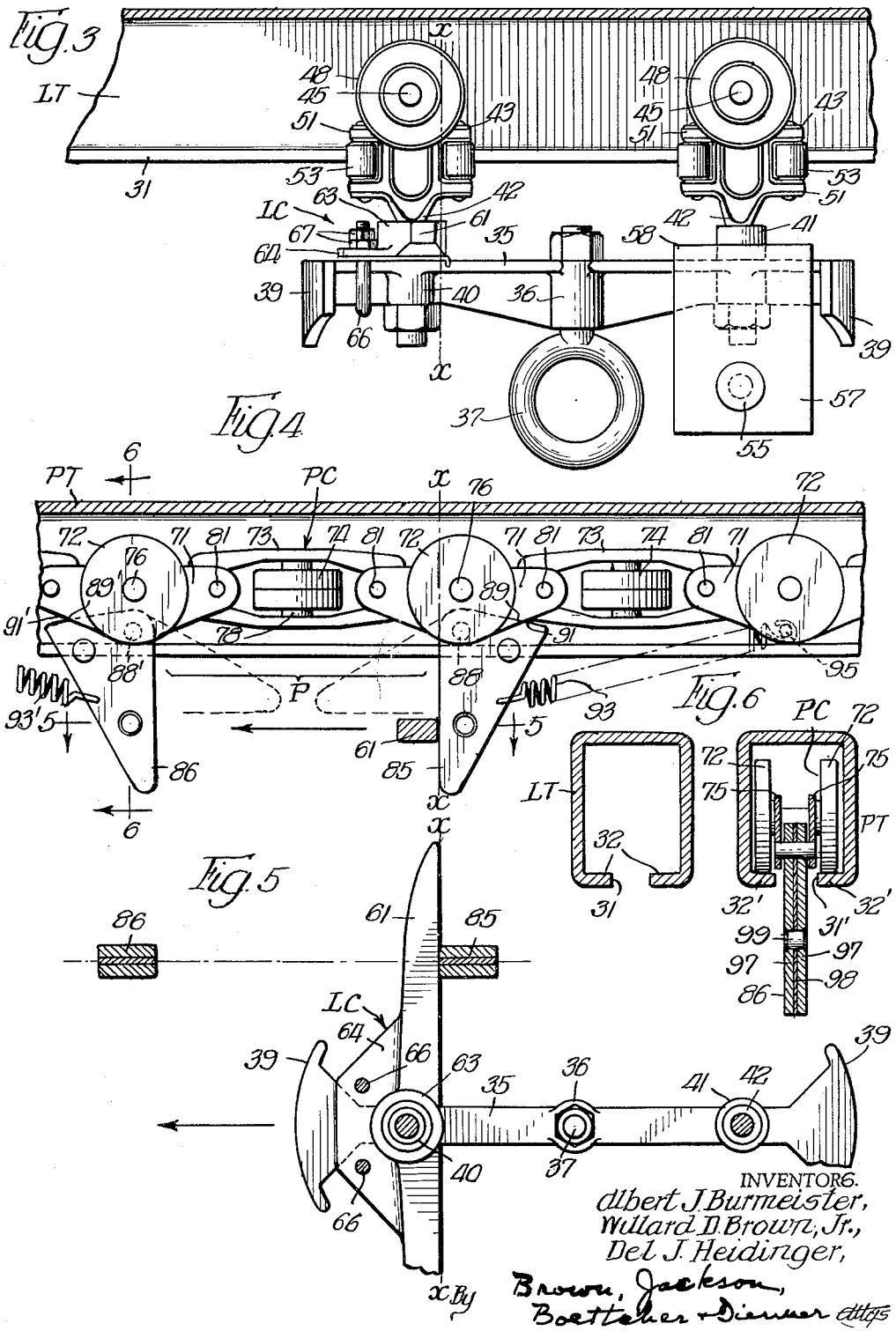

Aug. 7, 1962   A. J. BURMEISTER ET AL   3,048,123
AUTOMATIC DISPATCH CONVEYOR SYSTEMS
Filed June 20, 1957   11 Sheets-Sheet 3
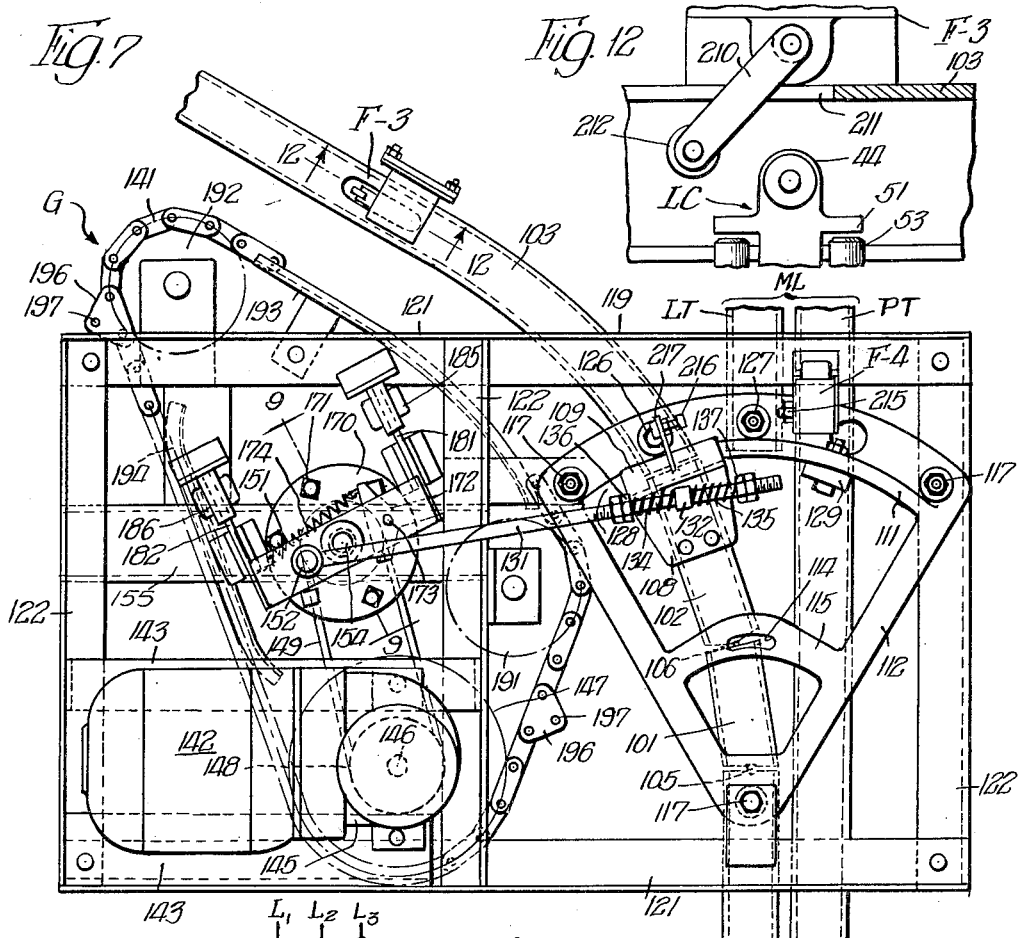
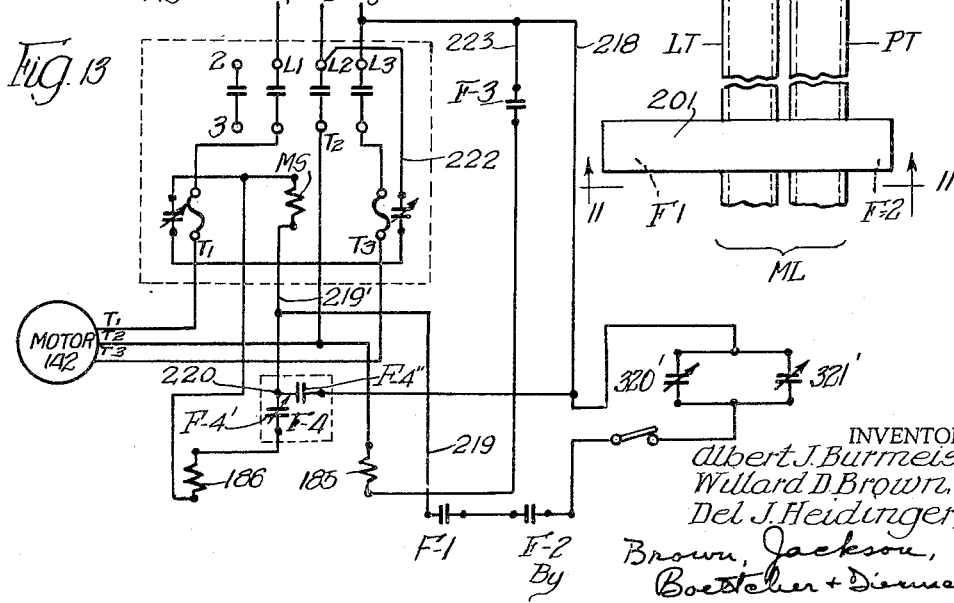
INVENTORS.
Albert J. Burmeister,
Willard D. Brown, Jr.,
Del J. Heidinger,
By Brown, Jackson, Boettcher + Dienner
ATTYS

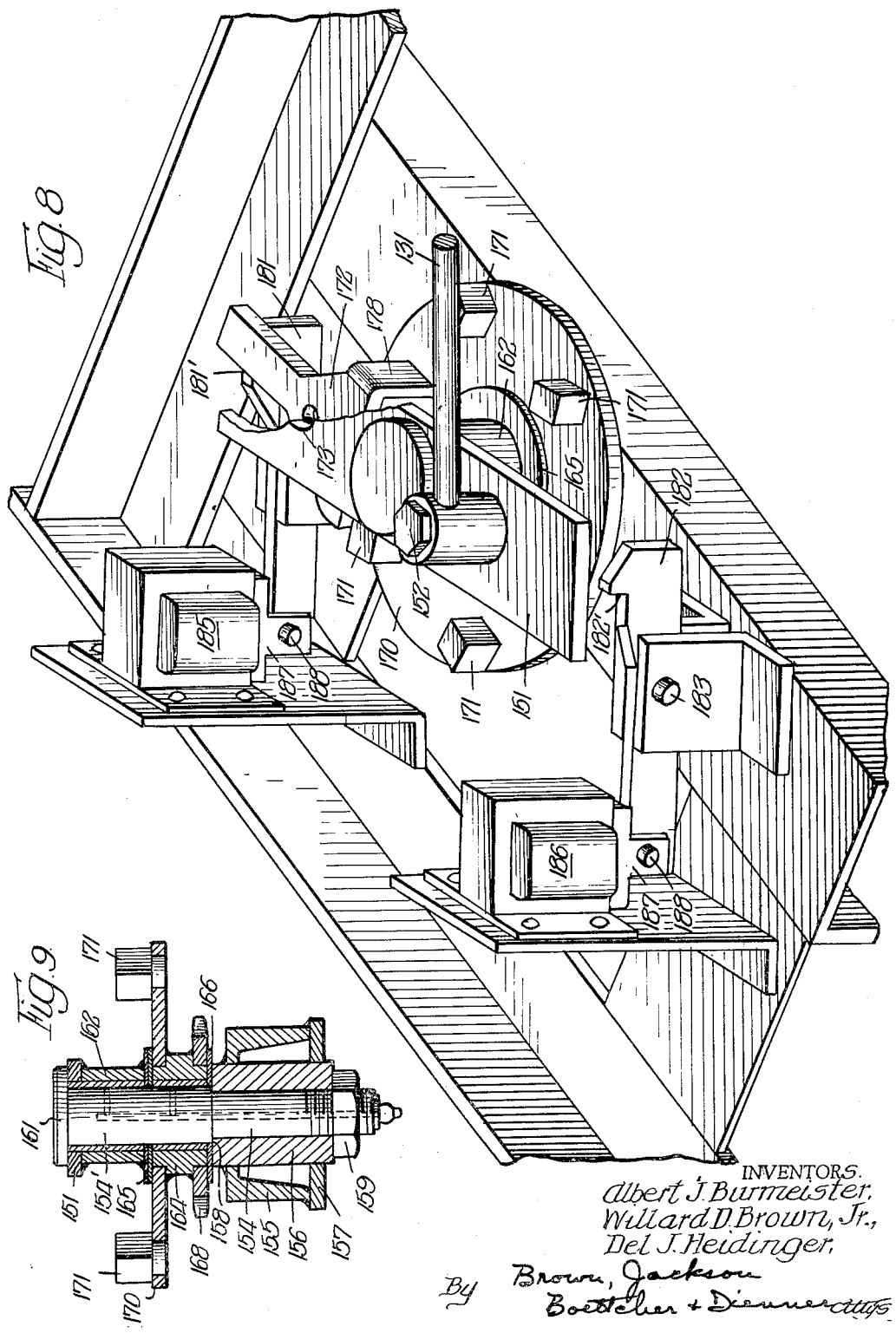

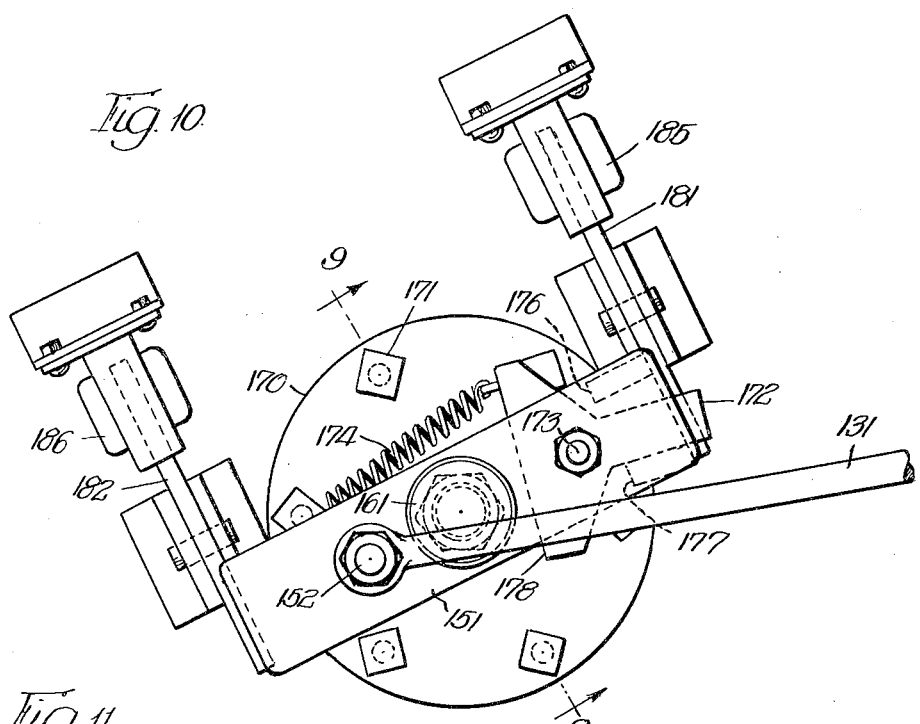
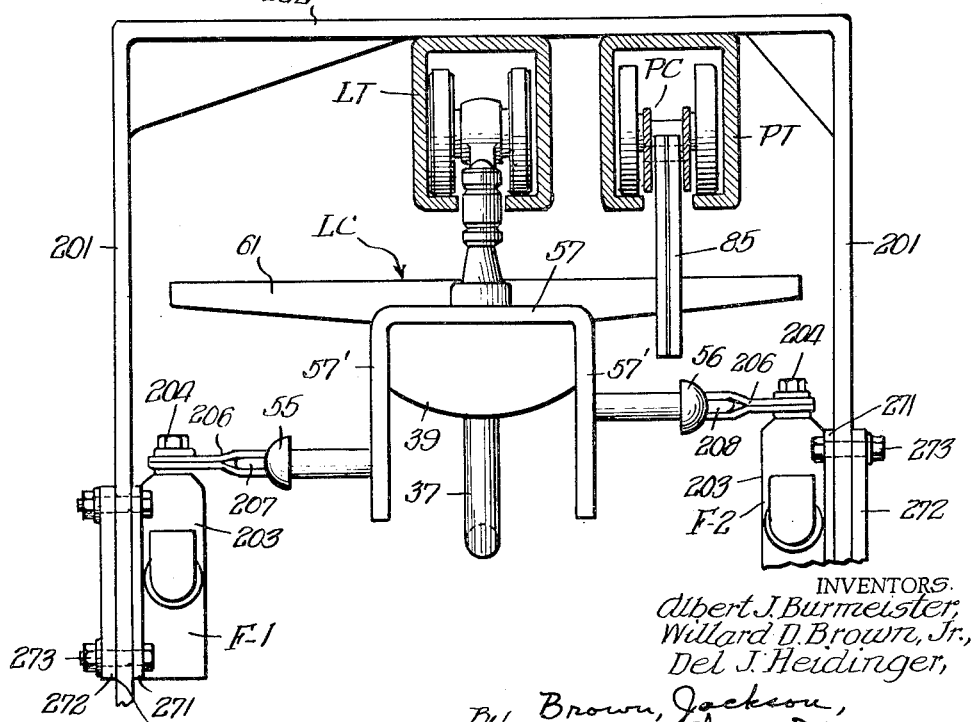

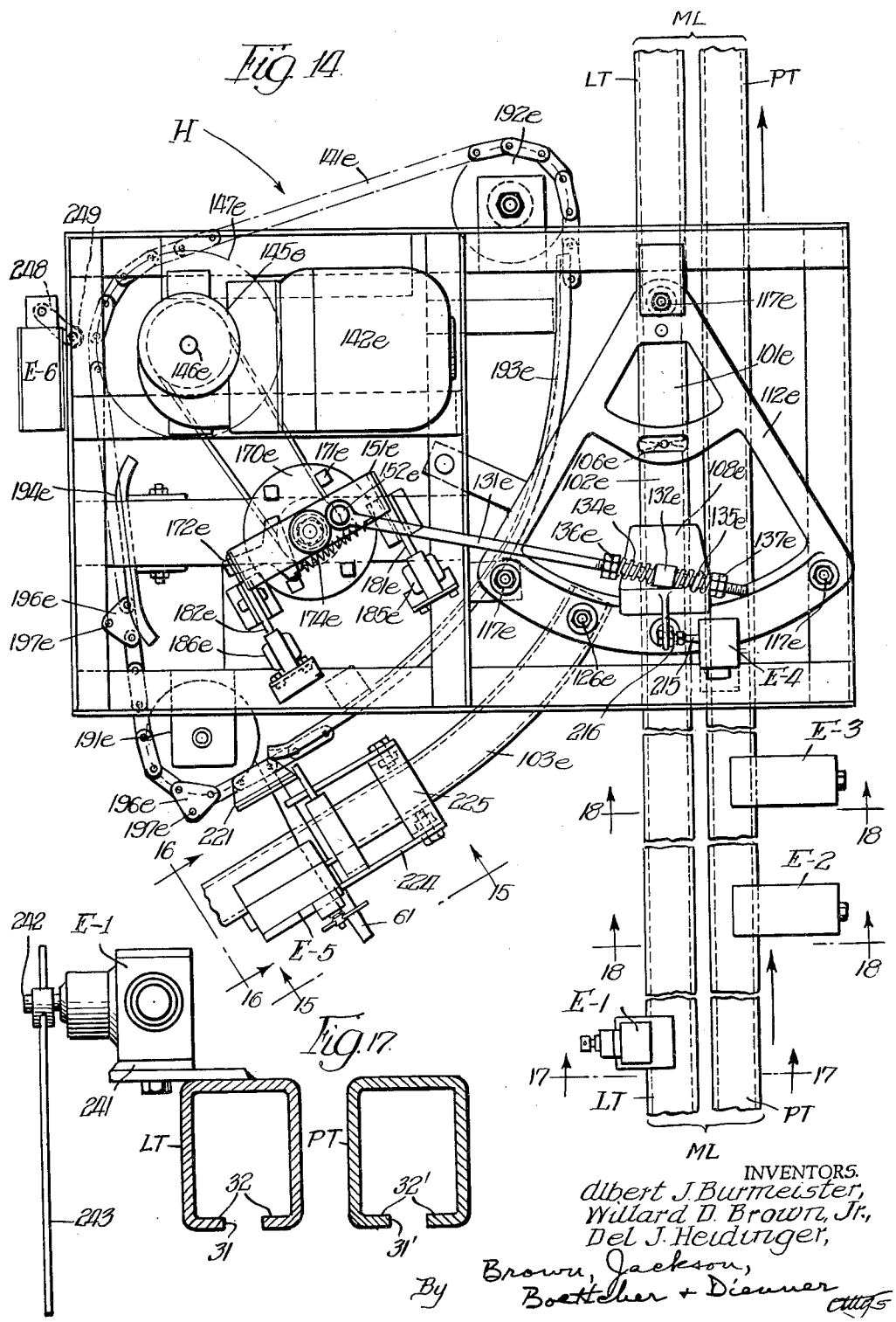

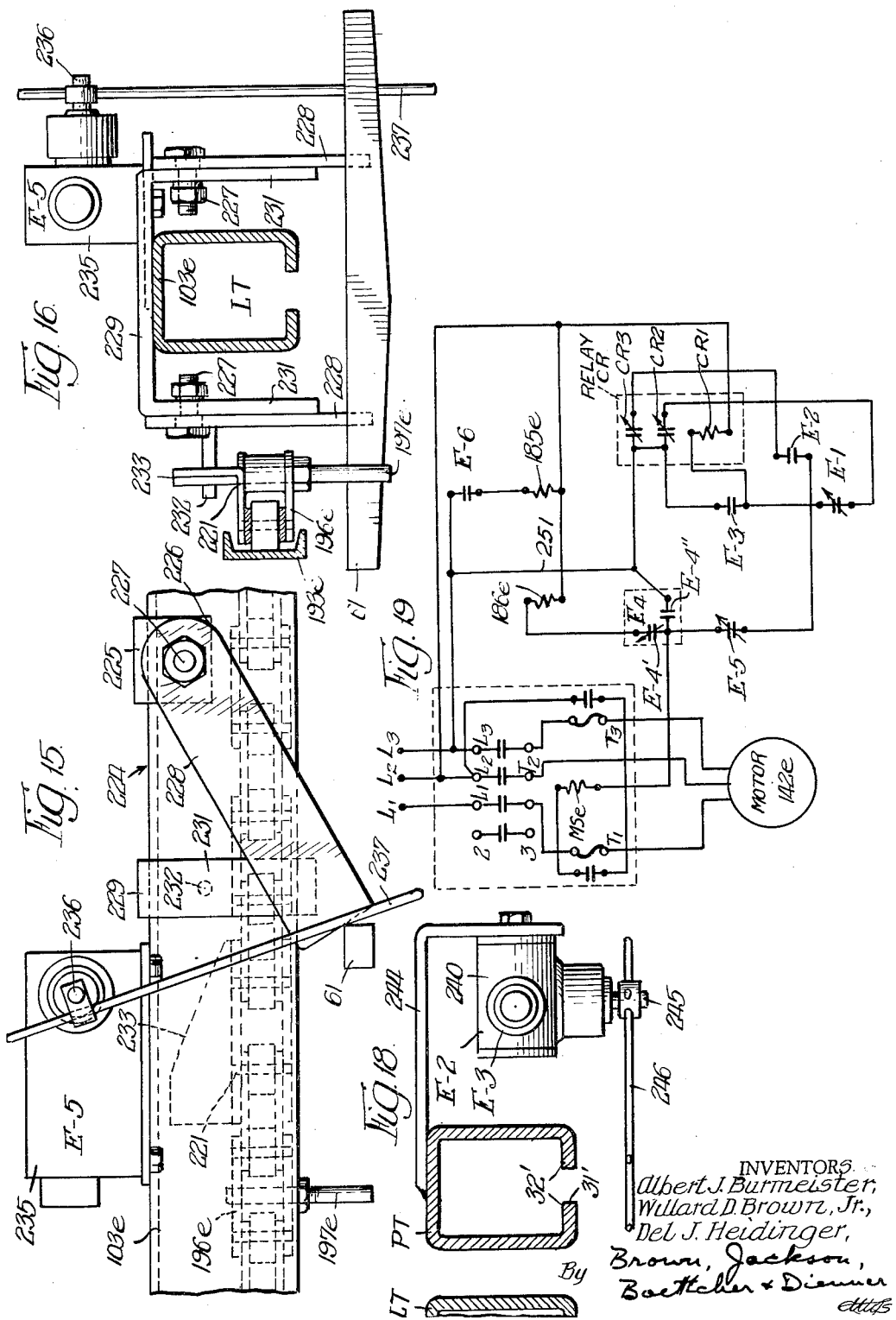

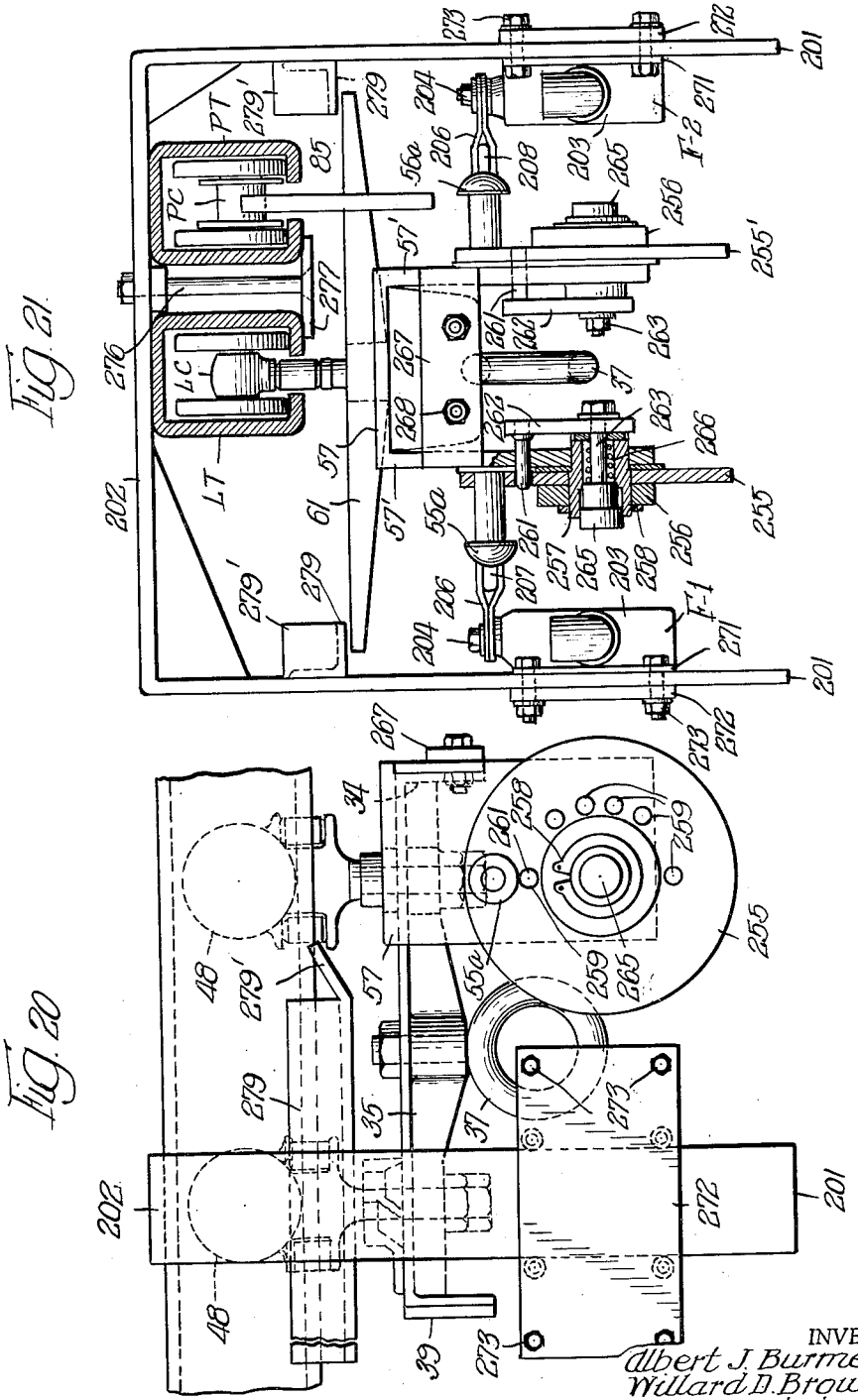

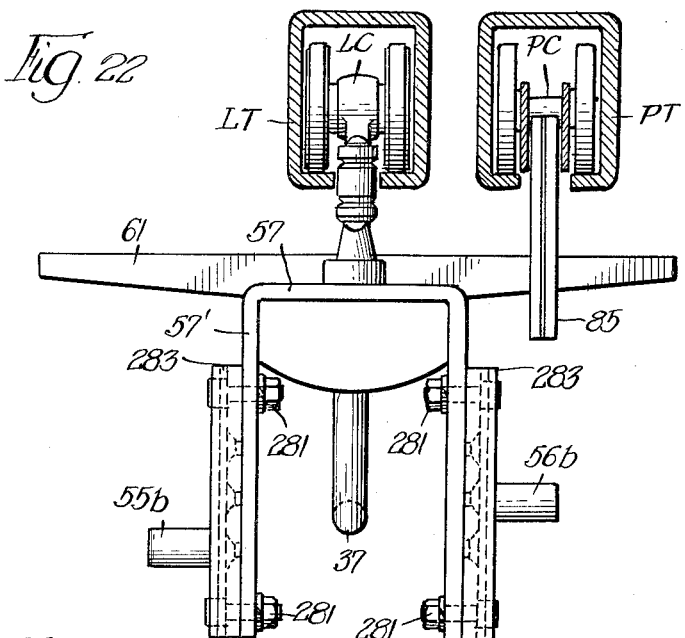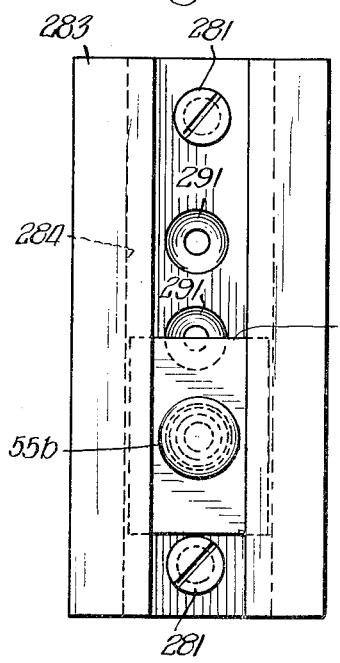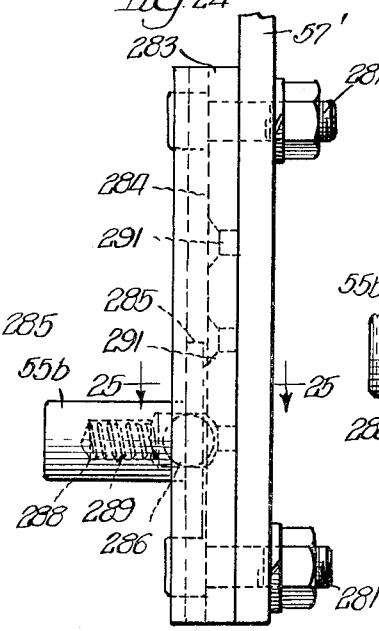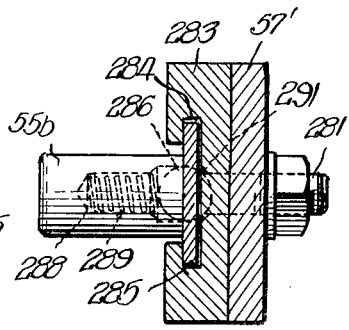

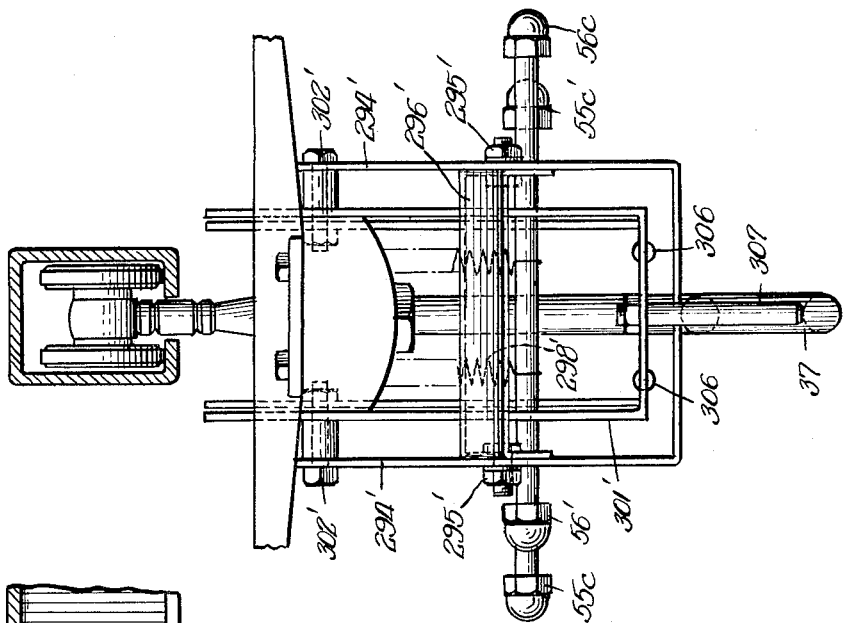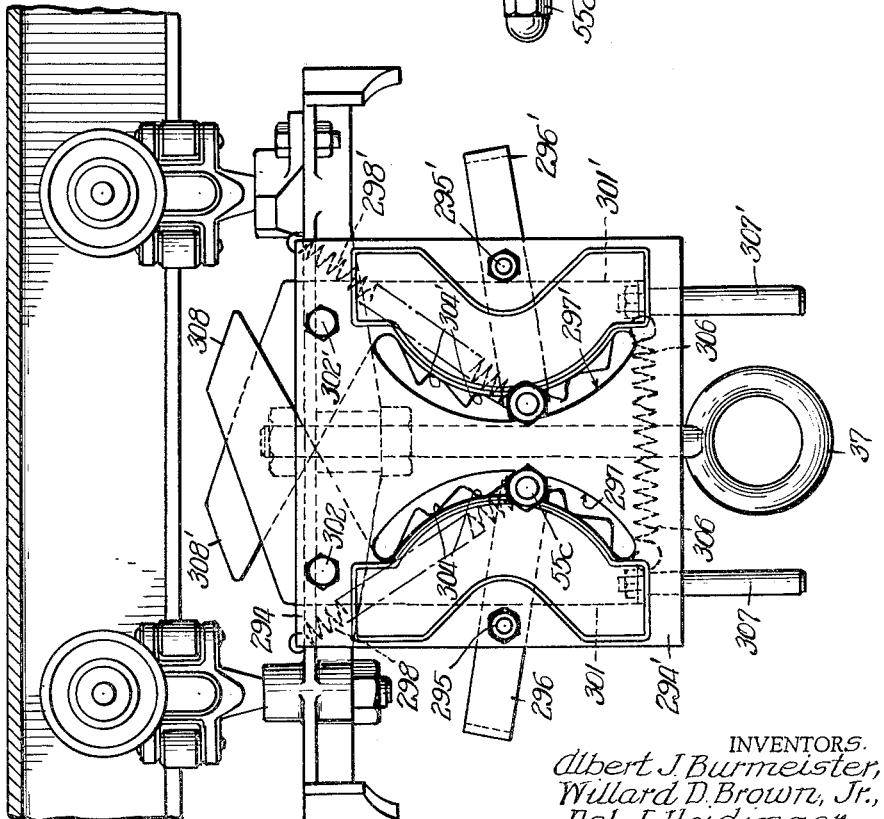

United States Patent Office 3,048,123
Patented Aug. 7, 1962

3,048,123
AUTOMATIC DISPATCH CONVEYOR SYSTEMS
Albert J. Burmeister, Willard D. Brown, Jr., and Del J. Heidinger, Aurora, Ill., assignors to Richards-Wilcox Manufacturing Company, Aurora, Ill., a corporation of Illinois
Filed June 20, 1957, Ser. No. 666,896
3 Claims. (Cl. 104—88)

The present invention relates to automatic dispatch conveyor systems, and particularly to such systems of the overhead track type wherein wheeled load supporting carriages travel along an overhead track to convey manufactured articles or other goods from place to place in a factory, shop or the like. As illustrative of one type of conveyor situation to which our invention is applicable, it may be used in a factory or shop to convey newly manufactured parts from a painting zone, where the parts are painted, to storage tracks where the suspended parts are allowed to dry, following which the carriers carry the parts back along the main track to an assembly station, packing station or the like.

It is one of the general objects of the present invention to provide an automatic dispatch conveyor system of the above general description which utilizes side-by-side twin tracks extending over that portion of the installation where the load carriers are power propelled. The wheeled load carriers roll along one of these twin tracks, and traveling along the other track is the drive chain which transmits propelling force to the wheeled load carriers. The side-by side location of the twin tracks reduces the required head room for the installation of the system; simplifies the operation of switching the load carriers from a main track on to storage tracks, and thence back to the main track; and possesses other advantages which will hereinafter appear.

Another object of the invention is to provide improved feed-in switches and improved escapement switches. The feed-in switches operate to divert or "feed-in" the load carriers from a main track on to one or more storage tracks or service tracks where the goods are temporarily stored, or where their travel is suspended or delayed while service is being performed upon the goods. The escapement switches serve to effect the escapement or return of the load carriers from the storage tracks or service tracks back to the main track upon the completion of the storage or service. These feed-in and escapement switches are of the electrically operated type, being governed by electrical controls either under manual response or automatic response.

In this regard, another object of the invention is to provide such feed-in and escapement switches wherein a single electric motor performs the two-fold function of (1) effecting the track switching operation for switching the load carriers from one track to another; and (2) effecting the power drive of the drive chain which is individual to that particular switch and which serves to drive the load carrier through the switch when the switch is in a deflecting or diverting position.

Another object of the invention is to provide improved adjusting arrangements for adjusting the selector pins which are mounted on the wheeled carriers for the purpose of tripping or actuating electrical control circuits in the travel of the wheeled carriers. These selector pins are movable or transposable into different coded positions with respect to their individual carriers so that all of the carriers may be made subject to a common control at a particular point in their line of travel, or so that different carriers may be coded for different control functions at different points in the system.

Other objects, features and advantages of the invention will appear from the following detailed description of certain preferred embodiments thereof. In the accompanying drawings illustrating such embodiments:

FIGURE 3 is a vertical sectional view taken approximately on the plane of the line 3—3 of FIGURE 2, showing one embodiment of load carrier;

FIGURE 4 is a vertical sectional view taken approximately on the plane of the line 4—4, of FIGURE 2, showing the pusher chain with its pairs of pusher and hold-back dogs.

FIGURE 5 is a fragmentary horizontal sectional view taken on the plane of the line 5—5 of FIGURE 4, this figure together with FIGURES 3 and 4 being located with their pusher planes x—x in vertical alignment.

FIGURE 6 is a detail sectional view taken approximately on the plane of the line 6—6 of FIGURE 4.

FIGURE 7 is a detail plan view of one of the feed-in track switches used between the main line portion of the track system and one of the storage or service tracks;

FIGURE 8 is a diagrammatic perspective view showing the latching arrangement of this feed-in track switch.

FIGURE 9 is a detail sectional view taken on the plane of the line 9—9 of FIGURE 7 showing the trunnion post mounting of the throw bar and driving disk.

FIGURE 10 is a fragmentary plan view on a larger scale showing the action of the clutch dog and throw bar.

FIGURE 11 is a diagrammatic transverse sectional view taken on the plane of the line 11—11 of FIGURE 7 showing the track switch control limit switches at the entering end of the feed-in track switch;

FIGURE 12 is a diagrammatic sectional view taken on the plane of the line 12—12 of FIGURE 7, showing the control or limit switch associated with the entering end of the storage track;

FIGURE 13 is a circuit diagram of the control circuit for the feed-in switch;

FIGURE 14 is a view similar to FIGURE 7, showing in plan one of the escapement switches used between the storage or service tracks and the main line portion of the track system;

FIGURE 15 is a fragmentary side elevational view, on a larger scale showing the carrier stop mechanism associated with the escapement switch, this view being taken on the plane of the line 15—15 of FIGURE 14;

FIGURE 16 is a fragmentary end view of the same carrier stop mechanism, being a transverse sectional view taken on the plane of the line 16—16 of FIGURE 14;

FIGURE 17 is a detail sectional view of one of the limit switches associated with the escapement switch, corresponding to a section taken on the plane of the line 17—17 of FIGURE 14;

FIGURE 18 is a similar sectional view of two other limit switches associated with the escapement switch, corresponding to a sectional view taken on the two section planes 18—18 of FIGURE 14;

FIGURE 19 is a circuit diagram of the control circuit for the escapement switch of FIGURE 14;

FIGURES 20 and 21 are side elevational and transverse sectional views of a load carrier having a modified arrangement of station selecting pins;

Figure 28:
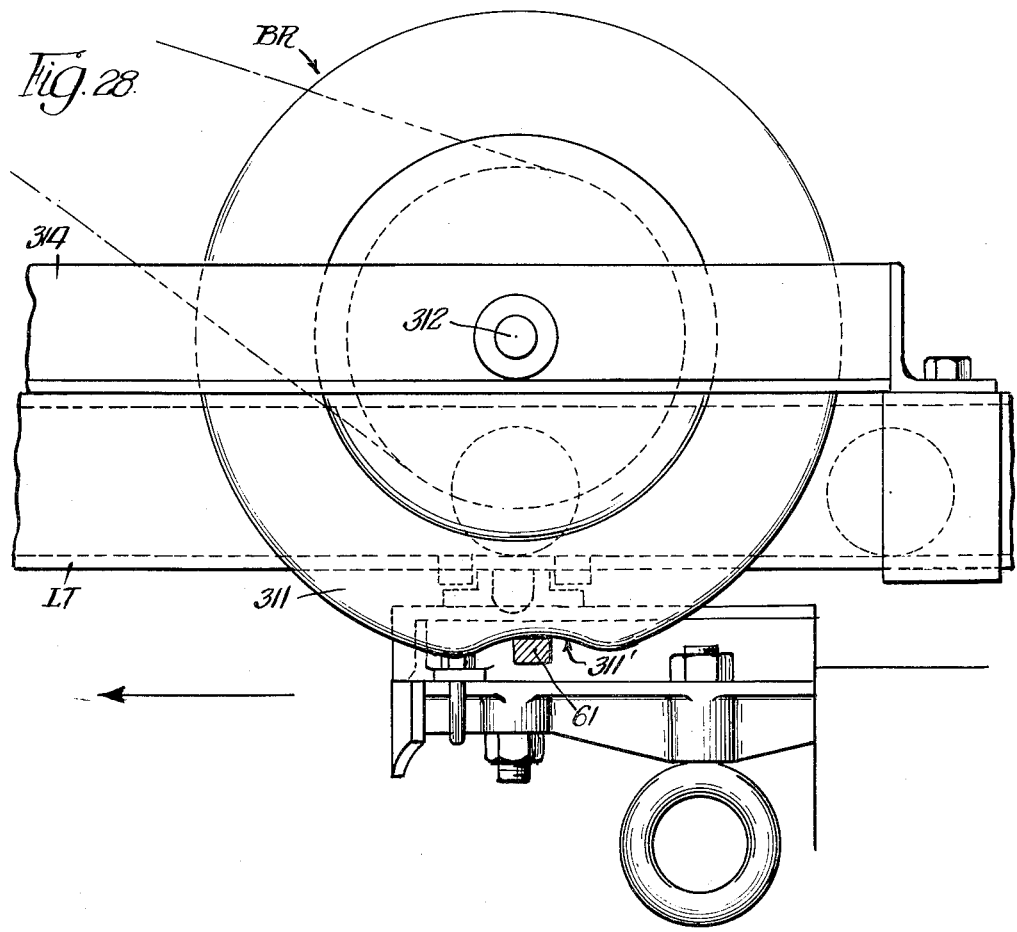
Figure 29:
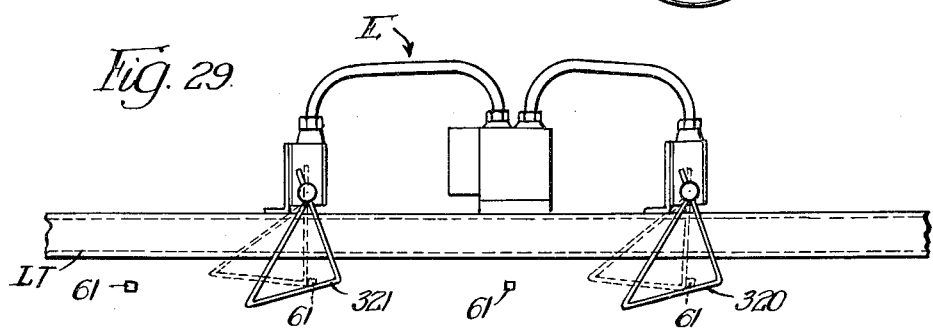
Figure 30:
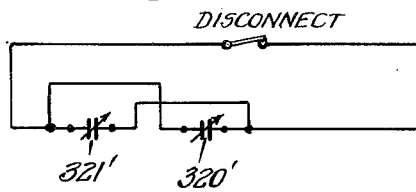

FIGURES 22 to 25, inclusive, are end elevational, front elevational, edge elevational and horizontal sectional views of a modified embodiment of station selecting pin mounting; FIGURE 25 being taken approximately on the plane of the line 25—25 of FIGURE 24;

FIGURES 26 and 27 are side elevational and end elevational views of still another embodiment of station selecting pins, this latter embodiment being adapted for automatic restoration of the pins;

FIGURE 28 is a fragmentary diagrammatic side elevational view of a booster-retarder device which may be used on the storage lines;

FIGURE 29 is a diagrammatic side elevational view of a full line sensing device; and FIGURE 30 is a circuit diagram of this full line sensing device.

Figure 1:
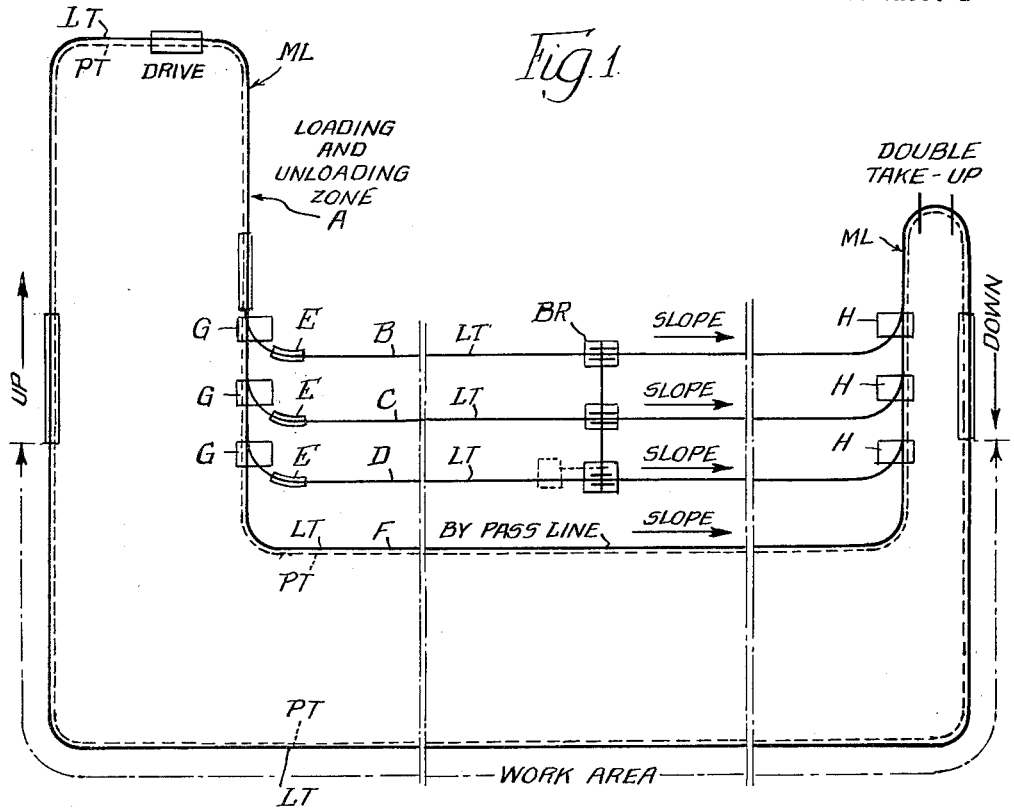
FIGURE 1 is a diagrammatic plan view of the track layout of one type of installation of our automatic dispatch conveyor system.

Referring first to FIGURE 1, this illustrates diagrammatically in plan a very basic layout of an automatic dispatch conveyor system. Those portions of this track layout which are shown in full lines represent load tracks LT along which the load supporting carriers travel. The closed loop portion of the layout shown in dotted lines represents the power track PT in which travels a power driven pusher chain for propelling the load supporting carriers along the load track LT lying in horizontally spaced side-by-side relation to the power track PT (see FIGURES 2, 6, etc.). In this basic layout, a loading and unloading zone is indicated at A, where the manufactured articles or other goods are loaded upon and unloaded from the wheeled load carriers. Branching from the main line just beyond this loading and unloading zone A are three storage lines B, C, and D, each consisting solely of a load track LT without any juxtaposed power track PT. At the entrance end of each of these storage tracks B-D is a full line sensing device E, which assumes a certain control position when its particular storage line becomes filled up with load carriers. For example, when non-selective load carriers are used, the first storage line B will fill up with load carriers until its full sensing device E renders the feed-in switch inactive. Thereupon, storage line C will load up until its full line sensing device E renders its feed-in switch inactive. Thereupon, storage line D will fill up until its full line sensing device E responds by rendering its feed-in switch inactive. Following this, subsequent load carriers will continue on around through by-pass line F and back to the starting point, from whence they will repeat the cycle of trying to get into one of the storage lines B, C or D.

The automatic feed-in switches which feed in or divert the load carriers from the main line ML to the branch storage lines, B, C and D, are diagrammatically illustrated in FIGURE 1 at G. The automatic escapement switches which return the load carriers from the branch storage lines B, C and D back on to the main line ML are diagrammatically illustrated at H. If desired, each of the branch storage lines B, C and D may have a booster-retarder device BR interposed therein. The desirability or necessity of such booster-retarder device depends upon the length of each storage line, the slope of the line, the weight of the load carried by each load carrier, and the susceptibility of the load to damage resulting from the possible end bumping of the load carriers on the storage lines. Such booster-retarder device will be later discussed.

It will be understood that the movement of the load carriers along the branch storage tracks B, C and D occurs solely under the action of gravity by reason of the downhill slope of these tracks, there being no power track or pusher chain associated with either of these storage lines. The different uphill and downhill slopes in the system are denoted in FIGURE 1.

Figure 2:
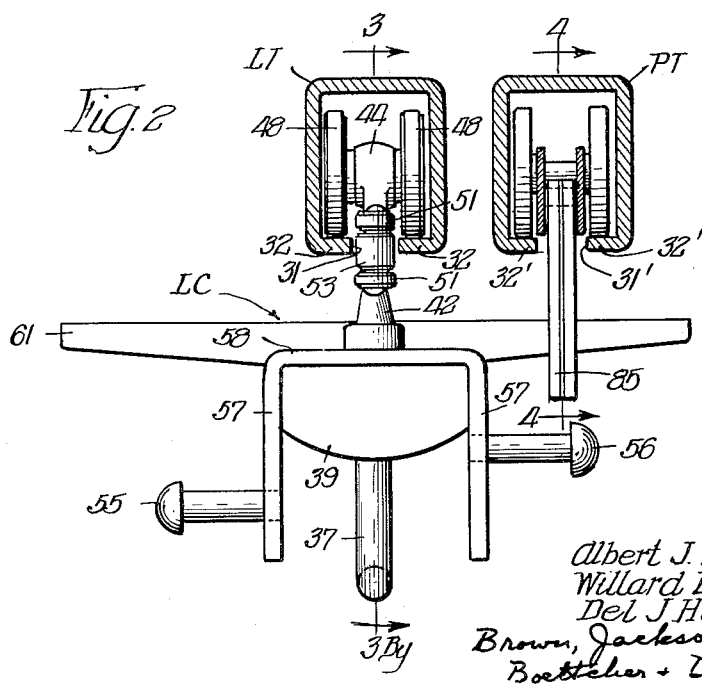
FIGURE 2 is a transverse sectional view through parallel side-by-side sections of the load track and power track, with a load carrier in the load track and the pusher chain in the power track, and showing the pushing relation between the two.

Referring now to the load track LT and the power track PT, it will be seen from FIGURES 2 and 6 that both of these tracks are of rectangular box-like section having longitudinally extending central slots 31 and 31' in their bottom walls. The flange lips 32 and 32' lying on both sides of the slots 31, 31' constitute the supporting rails along which roll the vertical wheels or rollers of the load carriers and also of the pusher chain.

Referring to FIGURE 3, each load carrier LC comprises a main horizontal load bar 35, which may be of different lengths for different load carrying capacities, ranging from approximately 10 inches to 16 inches in length. Formed centrally in this load bar 35 is a vertical boss 36 in which is mounted a depending eye bolt 37, or other suitable load suspension device. The ends of the load bar 35 are formed with curved bumpers 39 for bumping engagement with adjacent load carriers. Formed adjacent the front and rear ends of the load bar 35 are front and rear vertical bosses 40 and 41 respectively, in both of which bosses the shanks 42 of wheeled suspension hangers 43 have swiveled mounting for rotation about vertical axes. At the upper end of each suspension hanger is a horizontal boss 44 (FIGURE 2) from the opposite sides of which project a pivot pin or pins 45. Rotatably mounted on anti-friction ball bearings carried on such horizontal pivot pin or pins 45 are vertical load supporting wheels or rollers 48 which roll along the supporting flanges 32 at opposite sides of the central slot 31 in the load track LT.

Formed to extend from the front and rear sides of each suspension hanger 43 in the fore-and-aft plane of the track slot 31 are upper and lower fork arms 51 carrying vertical pivot pins on which are pivoted vertical guide rollers 53. These guide rollers have a loose rolling clearance in the track slot 31, and function to carry the side loads incident to following the track slot 31, particularly in rounding curves.

In FIGURES 2 and 3 we have shown the load carrier as provided with a very simple arrangement of station selecting pins. These comprise left hand selector pin 55 and right hand selector pin 56, which project horizontally outwardly to the left and to the right from the side flanges 57 of an inverted U-shaped stirrup 58. This stirrup has a central aperture in the cross bar portion thereof that fits down over the rear vertical boss 41 of the load bar, the depending side flanges 57 having a snug fit against the side edges of the load bar 35. These selector pins 55, 56 are mounted at coded heights in the side flanges 57 so as to actuate appropriate selector switches in the travel of the load carrier, whereby to actuate certain feed-in switches, etc. as will be hereinafter described in detail.

The propelling power of the pusher chain traveling in the power track PT is transmitted to the load carrier LC through a transversely extending pusher bar 61 having arms extending outwardly from the opposite sides of the load bar 35, adjacent to the front end thereof. As shown in FIGURE 5, this pusher bar has a central boss 63 which fits down over the front vertical boss 40 of the load bar. An apertured flange 64 projects forwardly from the central portion of the pusher bar, and passing upwardly through the apertures in said flange 64 are the threaded side arms of a U-shaped clevis 66 which embraces the underside of the load bar 35. These side arms of the clevis receive nuts 67 which rigidly clamp the clevis 66 and pusher bar 61 to the load bar 35. That portion of the pusher bar that projects toward the power track PT lies directly below the central slot 31' in the power track PT in position to be engaged by propelling dogs mounted on the pusher chain PC traveling in the power track.

Referring to FIGURE 4, the pusher chain, designated PC, is quite similar to the conveyor type of power driven chain disclosed in Hassler Patent 2,372,199, issued March 27, 1945. This chain comprises an alternating series of vertical links 71 mounting vertical wheels 72, and horizontal links 73 mounting horizontal wheels 74. The vertical links 71 comprise a pair of spaced side plates 75 through which passes a horizontal axle 76, on the projecting ends of which are mounted the vertical wheels 72. These vertical wheels 72 roll along the supporting flanges 32' on opposite sides of the bottom slot 31' of the power track PT. The horizontal links 73 are of chain link configuration comprising top and bottom portions through which passes a vertical axle 78 on which is pivoted a horizontal guide wheel 74. This guide wheel 74 has an outer diameter slightly less than the inside wall to wall spacing between the vertical side walls of the power track PT. These horizontal guide wheels 74 guide the power chain around horizontal curves in the power track. The vertical links 71 and the horizontal links 73 are articulated together for relative pivotal movement both horizontally and vertically, as by the provision of coupling pins 81 passing through the ends of the side plates 75 and through the loop ends of the horizontal links 73. This is all fully described in the aforesaid Hassler Patent 2,372,199.

At spaced points along the length of the pusher chain PC are mounted companion pairs of dogs 85 and 86 which extend down through the central slot 31′ in the bottom of the power track PT. In each companion pair of dogs, the dog 85 functions as a pusher dog, and the dog 86 functions as a hold back dog, both dogs being mounted on a contiguous pair of vertical links 71. The horizontal span between the vertical front edge of the pusher dog 85 and the vertical rear edge of the hold back dog 86 constitutes a driving or control pocket p into which extends the adjacent end of the pusher bar 61 projecting laterally from one of the load carriers LC. The pusher dog 85 is pivotally mounted at its upper corner between the side plates 75 of vertical link 71, on a transverse pivot pin 88. An upper stop shoulder 89 on the pusher dog 85 is normally held pressed upwardly against a cooperating stop surface 91 on the vertical link 71, whereby the pusher dog is positively held against counter-clockwise rotation about pivot pin 88 substantially in the position shown, but whereby the pusher dog can swing in a clockwise direction around pivot pin 88, substantially as indicated in dotted lines. A tension spring 93 has its front end connected to the sloping rear edge of the pusher dog 85 and has its rear end connected to a pin 95 extending between the side plates of the next vertical link 71. Thus, it will be seen that when the pusher bar 61 of an adjacent load carrier LC is traveling forwardly faster than the pusher dog 85 it strikes the sloping rear edge of the pusher dog and cams the dog in a clockwise direction around pivot pin 88 until the pusher bar can pass beneath the pusher dog, whereupon the pusher dog snaps back to its vertical driving position illustrated in full lines. Referring now to the hold back dog 86, this is substantially a duplication of the pusher dog 85 arranged in reverse relation. The hold back dog 86 is pivotally mounted at its upper corner on pivot pin 88′ carried by the next forward vertical link 71, and this hold back dog has a comparable stop shoulder 89′ adapted to engage stop surface 91′ on this vertical link 71 for preventing the hold back dog from pivoting in a clockwise direction beyond the full line position shown. A tension spring 93′ connected between the hold back dog and the transverse pin 95′ maintains the hold back dog 86 substantially in the hold back position shown in full lines, but permits this dog to pivot in a counter-clockwise direction. Thus, it will be seen that in the situation where the pusher chain PC is traveling forwardly relatively to a stationary load carrier, or is traveling forwardly at a higher speed than a moving load carrier, the pusher bar 61 will engage the sloping forward edge of the hold back dog 86, thereby camming this dog upwardly in a counter-clockwise direction until the pusher bar 61 can clear the lower end of the hold back dog whereupon the hold back dog will snap back to its normal vertical position. Accordingly, it will be seen that once the pusher bar 61 becomes confined in pocket p between the pusher dog 85 and the hold back dog 86 it remains confined in this pocket until separation of the load rail from the power rail removes the pusher bar laterally from said pocket. As shown in FIGURE 6, the pusher dog 85 and hold back dog 86 are of substantially duplicate construction, each comprising two outside plates 97 and a filler plate 98, held together by transverse rivets 99.

The feed-in switches G and the escapement switches H of FIGURE 1 are quite similar in their construction and operation to the conveyor track switch shown in Sheets Patent 2,434,523, issued January 13, 1948, to which attention is directed for related points of similarity. Referring now to FIGURES 7, 8, 9 and 10 showing the construction and operation of one of the feed-in switches G, it will be seen from FIGURE 7 that the power track PT extends continuously, without interruption, through the switch structure G from the entering section of main line ML to the exit section of main line ML. On the other hand, the load track LT has interposed therein at the feed-in switch G two swinging tongue sections 101 and 102 which, when in their feed-in positions, establish switching connection for the load carriers LC from the entering section of the load track LT into a curved section 103 of load track, which in turn communicates with any one of the branch storage lines B, C or D. The first swinging tongue section of load track 101 has pivotal junction with the entering section of load track LT on a stationary vertical pivot axis 105. The second pivotally swinging tongue section 102 of the switch has pivotal connection with the first swinging section 101 through a swinging pivotal connection 106. The outer end of the second swinging track section 102 has a swinging guide bracket 108 secured to its upper side. The outer end of this guide bracket is formed with an upwardly and outwardly bent guide lip or flange 109 which has sliding guided engagement on a stationary arcuate guide surface 111. This arcuate guide surface 111 is formed as a part of a V-shaped stationary frame casting 112 on which the swinging track sections 101 and 102 are mounted. The vertical pivot pin 105 passes upwardly through the apex portion of the frame 112, and the swinging pivot 106 has guided engagement in an arcuate slot 114 formed in an arcuate intermediate leg 115 of the frame casting 112. The V-shaped frame casting 112 is secured by bolts 117 to a sub-frame 119 made up of longitudinal angle bars 121, 121 and transverse angle bars 122—122. Bolts 126 and 127 are also provided to secure the curved track section 103 and the exit portion of the load track LT to the V-shaped frame casting 112. An end stop 128 having a bolted adjustable mounting on the outer arcuate portion of frame casting 112 is adapted to be engaged by slide bracket 108 when the outer swinging track section 102 is in alignment with the curved track section 103 leading to one of the storage tracks; and a like limiting stop 129 has bolted adjustable mounting to the outer arcuate portion of the frame casting 112 for limiting the opposite motion of the slide bracket 108 to a position bringing the second swinging track section 102 into alignement with the exit section of the load track LT.

The laterally swinging track sections 101 and 102 are adapted to be thrown from the through line position— in alignment with the exit section of load track LT—into the laterally deflected switching position in alignment with the curved track section 103, through the instrumentality of a motor driven connecting rod 131. The right hand end of this connecting rod 131 passes through the aperture of a thrust transmitting eye 132 which has swiveled mounting on the top side of the slide bracket 108 for pivotal rotation about a vertical axis. Surrounding the connecting rod 131, and bearing against opposite sides of the thrust transmitting eye 132 are compression springs 134 and 135 which are normally maintained under compression by adjusting nuts 136 and 137 that screw over the threaded outer end of the connecting rod 131. These compression springs cushion the slight continued movement of the connecting rod 131 in either direction of throw when the slide bracket 108 abuts the limiting stop 128 in the left hand switching position of the movable track sections, or when the slide bracket 108 strikes the limiting stop 129 in the through line position of the movable switch sections.

Referring now to the single electric motor arrangement which imparts the opposite directions of throw to the connecting rod 131 and which also operates the drive or conveyor chain 141 for driving the deflected load carriers through this feed-in switch G, this single electric motor, designated 142, is mounted on frame members 143 extending between the intermediate and left hand transverse angle bars 122. This motor 142, which in the illustrated preferred embodiment is a 220/440 volt, 60 cycle three phase motor, has its rotor shaft entering a gear housing 145, from the upper side of which extends a vertical countershaft 146 which is driven by the electric motor 142 at a reduced speed in the neighborhood of 20 r.p.m. Mounted concentrically on the countershaft 146 are an outer large diameter sprocket wheel 147 that drives the conveyor chain 141; and also an inner smaller diameter sprocket wheel 148 that drives through chain 149 the crank arm that actuates connecting rod 131.

The connecting bar 131 is given its switch actuating throw from a rotatable throw bar 151 of rectangular form having a crank pin or bolt 152 projecting from its top side. The adjacent end of the connecting bar 131 has a pivot eye which pivotally engages over this crank pin 152. This throw bar 151 is mounted for horizontal rotary movement around the upper end of a stationary vertical journal post 154 mounted in an intermediate longitudinal frame bar 155. As shown in FIGURE 9, this frame bar 155 is preferably a downwardly facing channel bar having a vertical mounting sleeve 156 extending downwardly therethrough. The mounting sleeve 156 is welded adjacent to its upper end to the web of the frame channel 155, and is welded at its lower end to a cross bar 157 which in turn is welded to the flanges of the frame channel 155. The journal post 154 has a shoulder 158 which is drawn down hard against the top of the mounting sleeve 156 by a nut 159 screwing over the threaded lower end of the journal post. The enlarged upper end 154' of the journal post is formed at its upper end with an end cap 161, and rotatably mounted on this enlarged upper end directly below the end cap 161 is a bearing sleeve 162, preferably lined with babbit or other bearing metal. The rectangular throw bar 151 has a central aperture therein which fits over the enlarged upper end 154' of the journal post, this throw bar having its underside welded to the upper end of the rotatable bearing sleeve 162.

Also mounted on the enlarged upper end 154' of the journal post is a bearing hub 164 which is located below the bearing sleeve 162 and is rotatable independently thereof. Separating washers 165 separate the end surfaces of the bearing sleeve 162 and bearing hub 164, and a separating washer 166 also separates the end surfaces of the bearing hub 164 and the stationary mounting sleeve 156. Welded to the lower end of the bearing hub 164 is a sprocket wheel 168 over which travels the roller chain 149 extending from inner sprocket wheel 148 on countershaft 146. Welded to the upper end of the rotatable bearing hub 164 is a circular drive plate or disc 170 which is arranged to rotate in a counterclockwise direction (FIGURE 7) whenever the electric motor 142 operates. Projecting upwardly from the top surface of this driving disc 170 is a plurality of (preferably six) equally spaced square headed driving lugs or heads 171, which are anchored in the driving disc, preferably with the diagonally opposite corners of their square heads lying on radial lines of the driving disc 170.

These driving lugs 171 are adapted to be engaged by a clutch dog 172 which is pivotally mounted on the underside of the throw bar 151. This clutch dog is pivotally mounted on a pivot pin or bolt 173 which extends down through the throw bar at that end of the bar opposite to the end which carries the crank pin 152. The cross bar portion of this T-shaped clutch dog has one end connected to a tension spring 174 which has its other end connected to the other end of the throw bar 151 for normally tending to swing the clutch dog 172 in a counterclockwise direction around the pivot pin 173. As shown in FIGURE 10, the shank portion of the clutch dog 172 has a range of oscillatory movements limited by the two stop lugs 176 and 177 projecting downwardly from the adjacent end of the throw bar 151, the tension spring 174 normally tending to swing the clutch dog in a counterclockwise direction up against the stop lug 176. Projecting downwardly from the other end of the cross bar portion of clutch dog 172 is a driving lug 178 (FIGURE 8) which is adapted to be swung outwardly into the path of the rotating driving lugs 171 whenever the spring 174 swings the clutch dog counterclockwise up against the stop lug 176. As soon as this happens, the throw bar 151 takes on the rotation of the motor driven drive disc 170, thereby rotating the crank pin 152 and operating through the connecting rod 131 to throw the switch sections 101, 102 from one position to the other.

The rotational motion of the throw bar 151 is limited to 180° in each cyclical operation so as to either open the track switch and stop, or to close the track switch and stop. This limiting of the rotative movement of the throw bar 151 to a throw of 180° is effected by two diametrically opposite dog latches 181 and 182 (FIGURE 8) which are pivotally mounted on horizontal pivot pins 183 at diametrically opposite sides of the drive disc 170. Projecting upwardly from the dog latch 181 is a stop shoulder 181' which is adapted to strike the shank portion of the clutch dog 172 when the movable track switch sections 101, 102 have been deflected laterally into the position shown in FIGURE 7, thereby swinging the drive lug 178 out of engagement with the adjacent driving stud 171 for releasing the throw bar 151 from continued rotation with the driving disc 170. Projecting upwardly from the other dog latch 182 is a stop shoulder 182' which is adapted to engage the shank portion of clutch dog 172 when the track switch sections 101, 102 have been swung back to their through-line positions, such engagement against stop shoulder 182' similarly serving to swing the lug 178 out of the path of the adjacent driving stud 171. The two dog latches 181 and 182 are adapted to be pivoted to releasing positions under the control of electrical solenoids 185 and 186. Solenoid cores 187 are adapted to be pulled upwardly upon the energization of their respective solenoids 185 and 186, these solenoid cores being operatively connected with their respective dog latches by transverse pivot pins 188. The manner in which these tripping solenoids 185 and 186 are energized in response to the operation of track switches will be later described in connection with FIGURE 13.

Referring now to the propelling chain 141 (see FIGURE 7), this also travels in a counter-clockwise direction, and travels from the outer sprocket wheel 147 over an idler sprocket wheel 191. From this first idler sprocket 191 the chain passes back over a second idler sprocket wheel 192, from whence the chain then passes back to the driving sprocket wheel 147. Intermediate the first and second idler sprockets 191 and 192, the inner side of the chain run is backed up by a curved guide track 193 which has a curvature corresponding more or less to the curved track section 103. Intermediate the second idler sprocket wheel 192 and the driving sprocket wheel 147, the inner side of the chain run may be backed up by a guide track 194. Interposed at one or more points in the length of the conveyor chain 141 are special pusher pin links 196 which project from the outer side of the chain and carry transverse pusher pins 197 spaced outwardly from the outer surface of the chain. These pusher pins 197 are adapted to engage the adjacent ends of pusher bars 61 projecting laterally from load carriers LC traveling through the shiftable track sections 101, 102 into the curved track section 103. The travel of the propelling chain 141 around the first idler sprocket wheel 191 and along curved guide track 193 brings the pusher pins 197 into positions where they engage the pusher bars 61 of load carriers LC for thereby propelling the load carriers through the switch and through the curved track section 193 when the track switch is in the deflecting position illustrated in FIGURE 7. At this time, the load carriers have moved away from the pusher dogs 85 of the pusher chain traveling in power track PT, and hence it is necessary to provide propelling means for picking up the deflected load carriers at this point for carrying them on through the track switch and up to the point where the load carriers start down the gravitational slope leading to the associated storage track B, C or D. It will be seen from the foregoing that the single electric motor 142 thus performs the dual function of throwing the track switch and also of driving the propelling chain 141. In the operation of throwing the track switch into the position shown in FIGURE 7, the crank pin 152 carries slightly beyond dead center and places the right hand buffer spring 135 under compression, which acts in tension through the connecting rod 131 to hold the clutch dog 172 pressed up firmly against the stop shoulder 181' of dog latch 181, with the result that the track switch tongue 101—102 is held firmly in its shifted position. On the reverse throw, the crank pin 152 also carries slightly beyond dead center and places the left hand buffer spring 134 under compression, which acts in compression through connecting rod 131 to hold the clutch dog 172 pressed up firmly against the stop shoulder 182' of dog latch 182, with the result that the track switch tongue 101—102 is then held firmly in its straight through position. We shall now describe the electrical control or limit switches and the associated circuit diagram which controls this feed-in track switch G.

Mounted on the load track LT at the entrance end of each feed-in switch G are two normally open entrance controlling switches F–1 and F–2, which, as shown in FIGURE 11, are mounted on the inner sides of vertical legs 201 of an inverted U-shaped bracket 202 which spans both the load track and the power track. Each switch housing 203 has an upwardly extending rotatable shaft 204 on which is mounted a swinging arm 206 carrying a roller at its inner end, these two rollers being designated 207 and 208. The switch housings 203 can be adjusted to different heights along the bracket legs 201, in order to code them for actuation by the coded selector pins 55 and 56 on the load carrier. Thus, by coding the relative heights of the two selector pins 55, 56, and correspondingly coding the relative heights of the entrance controlling selector switches F–1 and F–2, any one or more of the load carriers LC can be made automatically selective for selecting a particular feed-in switch G so as to be shunted upon a particular storage track B, C, D, etc. This will be later described in greater detail in connection with FIGURES 20 and 21.

Referring now to the third control switch F–3, which performs a restoring function for restoring the feed-in track switch G back to its normal straight through position, it will be seen that after a load carrier LC has been switched off the main line ML at a feed-in switch G, and starts out along the associated storage line B, C or D, it encounters and actuates this restoring or third control switch F–3, which is carried either by the curved track section 193 or by the storage track section. As shown in FIGURE 12, this restoring switch F–3 comprises a pivoted arm 210 extending down through a slot 211 in the top of the load track and carrying a roller 212 at its lower end which is adapted to be deflected upwardly by the wheeled trolley assembly at the front end of the load carrier LC. Such upward deflection of the arm 210 actuates the restoring switch F–3, and following the passage of the load carrier beyond this point the arm 210 then swings back to its normal lowered position.

The arcuate movement of the swinging guide bracket 108 in effecting swinging of the shiftable track sections 101—102 is also arranged to effect actuation of a fourth control switch F–4, which performs a track responsive cycle terminating function for automatically restoring its respective feed-in track switch G back to normal straight-through position. This latter control switch F–4 is mounted on the V-shaped frame casting 112 and has a laterally projecting plunger 215 which is adapted to be actuated by the head of a bolt 216 which is adjustably mounted in a bracket arm 217 extending outwardly from the sliding guide bracket 108. This track responsive or fourth control switch F–4 is a two-way switch, opening one circuit while it completes another, and vice versa, as shown in FIGURE 13. That is to say, this switch F–4 comprises two sets of contacts F–4' and F–4" which are opened and closed alternatively. When the track switch tongue 101—102 of the associated feed-in track switch G is in its normal straight-through position, the first set of contacts F–4' stand closed and the other, or second set of contacts, F–4" stand open. Conversely, when the track switch tongue 101—102 starts moving from this normal straight-through position towards its laterally deflecting switching position, the first set of contacts F–4' moves to open circuit position and the second set of contacts F–4" moves to closed circuit position, these two sets of contacts remaining in such positions until the track switch tongue 101—102 is restored to its normal straight-through position, whereupon these contacts are restored to normal positions.

Referring briefly to the functions performed by each of the above described four control switches, the first coded entrance switch F–1 cooperates with the second coded entrance switch F–2, connected in series therewith, to initiate the operation of the feed-in switch tongue 101—102 to the curved position. Restoring switch F–3 initiates the action of returning or restoring the feed-in switch tongue 101—102 to the straight through position. Track responsive switch F–4 provides the following three operations, depending upon the position of the feed-in switch tongue 101—102;

(a) When the switch tongue is in the straight through position, this track responsive switch F–4 has its contacts F–4' in closed position and its contacts F–4" in open position, thereby providing a circuit through the left hand latch tripping solenoid 186 when the series connected entrance control switches F–1 and F–2 are actuated into closed circuit positions;

(b) When the switch tongue 101—102 is in the curved or deflecting position (FIGURE 7), this switch F–4 has its contacts F–4' in open position and its contacts F–4" in closed position, which latter contacts establish a circuit through the magnetic starter coil MS (FIGURE 13) the energization of which starter coil MS closes the motor switch and starts the operation of the electric motor 142;

(c) When the switch tongue 101—102 returns to the straight through position, the opening of contacts F–4" of this control switch F–4 breaks the circuit through the magnetic starter coil MS, the deenergization of which starter coil MS stops the electric motor 142, whereupon the cycle is completed.

The following steps occur in the operational sequence of each feed-in switch G:

(1) The selector pins 55 and 56 on the load carrier LC first actuate the coded entrance switches F–1 and F–2 substantially simultaneously.

(2) These series connected coded entrance switches F–1 and F–2 thereupon set up a circuit which extends from line conductor $L_3$ through conductor 218 and through the full line sensing switches 320', 321' (to be later described) to these entrance switches F–1 and F–2. From these latter switches the circuit continues through conductors 219 and 219', the latter connecting between one end of the magnetic starter coil MS and the joint terminal 220 which leads from the two sets of contacts F–4' and F–4" of the track responsive switch F–4. Thus, the closing of entrance switches F-1 and F-2 by-passes the open contacts F-4″ of the latter switch F-4 for placing the line voltage from line conductor L₃ upon one end of the magnetic starter coil MS. The line voltage from line conductor L₂ is normally impressed through conductor 222 upon the other end of magnetic starter coil MS. The magnetic starter then closes, placing the motor 142 on the line. At the same time, a circuit is set up through the closed contacts F-4′ of switch F-4 that energizes solenoid 186.

(3) The operation of electric motor 142 starts the drive chain 141 and the driving plate or disk 170 into motion.

(4) The energization of solenoid 186 actuates dog latch 182, thereby releasing clutch dog 172.

(5) The clutch dog spring 174 draws the clutch dog 172 into position for engagement with the lugs 171 on the driving disk 170.

(6) The engagement of driving disk lug 171 with shoulder 178 of the clutch dog 172 rotates the clutch dog and the attached throw bar 151.

(7) The rotation of throw bar 151 operates through the instrumentality of connecting rod 131 to draw the track switch tongue 101—102 toward the laterally deflected or curved position.

(8) The travel of the track switch tongue 101—102 towards its deflected or curved position releases the plunger 215 of track responsive switch F-4, thereby reversing its contacts.

(9) The track responsive switch F-4 now establishes a circuit for the magnetic starting coil MS.

At this juncture, it should be noted that steps 2 through 9 take place while the selector pins 55 and 56 of the load carrier LC are holding the contacts closed on the coded entrance switches F-1 and F-2.

(10) The driving disk 170 operates through the clutch dog 172 to rotate the throw bar 151 through 180°. The track tongue 101—102, by motion transmitted through the connecting rod 131, is drawn to the deflected or curved position.

(11) As the throw bar 151 reaches the 180 degree position, it drives the clutch dog 172 into dog latch 181. Dog latch 181 overcomes the clutch dog spring 174 and rotates the clutch dog 172 out of contact with the driving lug 171 on the driving disk 170. This allows the driving disk 170 to continue rotating, while the shiftable track tongue 101—102 remains at rest in the deflected or curved position.

(12) The load carrier is pushed into range of the drive chain 141 by the pusher chain PC. The drive chain 141 picks up the load carrier and pushes it through the feed-in switch G onto the gravity line. As the load carrier enters the gravity line, it is pushed through or past the restoring switch F-3, actuating the switch and thereby initiating the return cycle.

(13) The actuation of this restoring switch F-3 energizes solenoid 185, which trips dog latch 181, thereby releasing clutch dog 172. This energization of solenoid 185 is effected through conductor 223 which connects the line conductor L₃ with one end of the solenoid 185 when switch F-3 closes, the other end of this solenoid being normally connected with associated line conductor L₂.

(14) The clutch dog spring 174 thereupon immediately swings the clutch dog 172 into position for engagement with one of the driving disk lugs 171.

(15) The driving disk lug 171 engages the clutch dog 172 and rotates the clutch dog together with the attached throw bar 151.

(16) Throw bar 151 operates through the connecting rod 131 to push the switch track tongue 101—102 back to its normal or straight through position.

(17) The driving disk 170, through the clutch dog 172, rotates the throw bar 151 through 180°, thereby completing the movement of the track tongue 101—102 into the straight position.

(18) As the throw bar 151 reaches the 180° position it drives the clutch dog 172 into dog latch 182. Dog latch 182 overcomes the clutch dog spring 174 and rotates the clutch dog out of contact with the driving lug on the driving disk 170. At the same time, through the linkage of the connecting rod 131, the track tongue 101—102 reaches the straight position. As the track tongue reaches the straight position, it depresses the plunger 215 of track responsive switch F-4, returning its two sets of contacts to their original positions. This action breaks the circuit of the magnetic starter coil MS, taking the motor 142 off of the line, and thereby completing the cycle.

Referring now to the escapement switches H, these are very similar in construction and operation to the feed-in switches G, and accordingly we have used the same reference numerals, with the suffix e added thereto, to designate the corresponding parts in these escapement switches. Referring to FIGURE 14 showing one of the escapement switches H in detail, it will be seen that the power track PT extends continuously, without interruption, through the switch structure H, the same as in the feed-in switches G. The travel of the load carriers and pusher chain is in an upward direction in FIGURE 14, as indicated by the arrows. The load track LT has interposed therein at the escapement switch H the two swinging tongue sections 101e and 102e which, when in their laterally deflected or escapement positions, establish switching connection for the load carriers LC leaving the curved section 103e of a storage line and entering the exit section of the load track LT extending away from the switch H. These swinging tongue sections 101e and 102e are actuated through connecting rod 131e having connection with crank pin 152e projecting upwardly from throw plate 151e, all as described above in connection with the feed-in switch G. The drive chain 141e is provided with pusher pin links 196e having pusher pins 197e projecting therefrom, as in the feed-in switch, but in addition, this drive chain is provided with a specially formed cam link 221. This cam link 221 immediately precedes one of the driving pin links 196e on the driving chain 141e, and operates to trip or release carrier stop mechanism 224 associated with the curved track section 103e leading from the storage track to the escapement switch. This carrier stop mechanism 224 is illustrated in detail in FIGURES 15 and 16, from which it will be seen that it comprises a U-shaped mounting strap 225 which is welded across the top of the track section 103e and has downwardly extending outer ears 226 which carry horizontally extending pivot bolts 227. Pivotally mounted on the pivot bolts 227, on the outer sides of the depending ears 226, are two stop levers 228, one on each side of the track section 103e. These two stop arms 228 are joined together for conjoint operation by a U-shaped stirrup 229 which extends across the top of the track section 103e and has downwardly extending side legs 231 which are welded at their lower ends to the inner sides of the stop arms 228. A lifting pin 232 projects inwardly from the inner side leg 231 of the stirrup in a position where it can be acted upon by the cam link 221. This cam link comprises a link bar which is pivotally connected to the pivot pins of two adjacent rollers of the drive chain 141e, this link being provided with an upwardly extending flange along the forward edge of which is formed a cam slope 233 (FIGURE 15). Normally, the two stop arms 228 hang down in the position shown in FIGURE 15, with the cross bar portion of the connecting stirrup 229 resting on top of the track 103e. In this position, the stop arms 228 constitute a blocking barrier adapted to engage the pusher arm 61 of any load carrier seeking escapement from a storage track out through curved track section 103e to the escapement switch H, such pusher bar 61 being shown in FIGURES 14, 15 and 16. This holds any load carrier LC in abeyance in the storage track, pending the time when the escapement switch H has been shifted into position for permitting this load carrier to enter the main line ML. After the motor 142e of the escapement switch H has been energized and has shifted the movable track sections 102e, 101e into alignment with the curved track section 103e, the concurrent motion of the driving chain 141e brings the cam link 221 into juxtaposition to the carrier stop mechanism 224, with the result that the cam slope 233 operates against the lift pin 232 for swinging the two stop arms 228 upwardly into positions where they clear the pusher arm 61 of the load carrier awaiting entrance into the escapement switch. Located at a point in the drive chain 141e behind the cam link 221 is a drive pin link 196e carrying a downwardly extending drive pin 197e. As soon as the cam slope 233 has swung the stop arms 228 upwardly to clearing positions, the drive pin 197e strikes the back side of the pusher arm 61 and carries the load carrier forwardly along the curved track section 103e into and through the shiftable track sections 102e and 101e up to the point where the pusher bar 61 finds engagement between a hold back dog 86 and a pusher dog 85 traveling on the underside of the pusher track PT.

Mounted on the track section 103e adjacent to the carrier stop mechanism 224 is a readiness indicating switch E-5 which indicates when a load carrier is standing in readiness on the storage track, awaiting passage through the escapement track switch H for travel along the main track. As shown in FIGURES 15 and 16, this indicating switch E-5 comprises a housing 235 bolted to the top of the track section 103e and having a rotary actuating shaft 236 projecting from the side thereof. Extending downwardly and forwardly from this shaft 236 is a switch tripping rod 237 which lies in the path of the pusher bar 61, whereby when the pusher bar 61 of a load carrier occupies the blocked position shown in FIGURE 15, the rod 237 will be inclined forwardly by the front edge of the pusher bar, thereby placing the switch E-5 in closed circuit position to indicate that there is a load carrier in readiness in the storage track, awaiting escapement through the escapement switch. When the pusher bar 61 is unblocked and moves on through toward the escapement switch the rod 237 merely swings upwardly and then drops down behind the back of the pusher bar into a substantially vertical position, in which relation the indicating switch E-5 moves to open circuit position.

Interposed in the main line ML at the entering side of the escapement switch H are three control switches E-1, E-2 and E-3. The first switch E-1 functions as a detecting switch for detecting the presence of a load carrier on the main line at the entrance end of the escapement switch H. This detecting switch E-1 is illustrated in FIGURE 17, from which it will be seen that it comprises a switch housing mounted on bracket 241 welded to the top of the load track LT. Extending from this switch housing is a horizontal shaft 242 which mounts a downwardly extending switch actuating rod 243. This rod 243 normally occupies a position where it will be engaged by the pusher bar 61 of each load carrier LC as the load carrier approaches the escapement switch H through load track LT. This detecting switch E-1 normally stands in closed circuit position, and is moved to open circuit position by the pusher bar 61 of each load carrier on the main track swinging the rod 243 in a carriage advancing direction.

The second and third limit switches E-2 and E-3 are both substantially the same both being tripping switches and both being illustrated in FIGURE 18. These tripping switches E-2 and E-3 each comprises a similarly shaped housing 240 which is secured to an L-shaped bracket 244 that is welded to the power track PT and extends outwardly therefrom. In this instance, each switch is mounted with its pivot shaft extending vertically, and projecting inwardly from this shaft is a horizontally extending switch actuating rod 246 which normally occupies a position directly below the power track PT. In this location, the rod 246 is in position to be swung horizontally by each dog set of the pusher chain (i.e. by the combination of a hold back dog 86 and pusher dog 85). Both tripping switches E-2 and E-3 normally stand in open circuit positions, and are moved to closed circuit positions in sequence by each dog set 85—86 of the pusher chain.

Mounted on the V-shaped frame is a track responsive fourth control switch E-4 which functions comparably to the track responsive cycle terminating switch F-4 of the feed-in switch G. That is to say, this track responsive switch E-4 has a plunger 215 projecting from the side thereof, which plunger is adapted to be engaged by a bolt 216 mounted on the sliding guide bracket 108e. As shown in the circuit diagram of FIGURE 19 this other track responsive switch E-4 also comprises two sets of alternatively operating contacts E-4' and E-4", the contacts E-4' normally standing in closed circuit position when the shiftable track tongue 101e—102e is likewise standing in its normal straight-through position.

The indicating switch E-5 which responds to and indicates the presence of a load carrier in the storage track awaiting entrance to the escapement switch, has been previously described in connection with FIGURE 15.

Mounted adjacent to the large driving sprocket wheel 147e is a sixth control switch E-6, which functions as a restoring switch, comparable to the previously described restoring switch F-3. This switch comprises a swinging arm 248 which mounts a roller 249 normally disposed in a position just clearing the outer surface of the drive chain 141e, in which position the arm 248 will be deflected laterally by the passage of each drive pin link 196e carried by the drive chain 141e. This restoring switch E-6 normally stands in open circuit position, and is moved to closed circuit position by each drive pin link 196e deflecting the roller 249 laterally outwardly.

The complete control circuit of each escapement switch H also includes a control relay CR which comprises an energizing coil CR1 and two sets of relay contacts CR2 and CR3, which are both held in closed circuit positions when the energizing coil CR1 is energized.

Referring briefly to the functions performed by each of the above described six control switches, and with particular reference to the circuit diagram of FIGURE 19, the normally closed detecting switch E-1 breaks the holding circuit through coil CR1 of control relay CR when this switch detects the presence of a load carrier on the main line at the entrance end of the escapement switch H; that is to say when a dog set (85—86) approaches the escapement switch with a load carrier being propelled thereby, i.e. with the pusher bar 61 of the load carrier being propelled between the dogs 85 and 86. This relay holding circuit extends from supply line conductor L3 over conductor 251 and through the relay contacts CR2, which are maintained closed when relay CR is energized. From these relay contacts the holding circuit continues through detecting switch E-1 to the relay coil CR1. Such function of switch E-1 of breaking this relay holding circuit and preventing operation of escapement switch H at this time makes it impossible to feed a load carrier from the storage line into the main line when the corresponding space or portion of the pusher chain is already occupied by a load carrier. Normally open tripping switch E-2 cooperates with exit switch E-5 and with the contacts of control relay CR in initiating the operation of the shiftable track sections 101e, 102e to the deflected or curved position. Normally open tripping switch E-3 reactivates the control relay circuit after the load carrier LC has passed the first tripping switch E-2, the carrier thereupon striking the second tripping switch E-3 and reactivating the circuit so that an empty dog set 85—86 (without a load carrier) will operate the escapement switch H when the first tripping switch E-2 is actuated. Track responsive switch E-4 provides three operations depending upon the position of the escapement switch tongues 101e, 102e:

(a) When the switch tongue is in its straight through position, track responsive switch E-4 stands in its normal position with its two pairs of contacts in the position shown in FIGURE 19, with contacts E-4' closed and contacts E-4" open, thereby providing a circuit through contact E-4' and through solenoid 186e when first tripping switch E-2 is actuated. This circuit which then energizes solenoid 186e extends from line conductor $L_3$ through relay contacts CR3 and through switches E-2, E-5 and E-4' to one end of the solenoid 186e, the other end of this solenoid having permanent connection to the associated line conductor $L_2$.

(b) When the switch tongue is in the deflecting or curved position, track responsive switch E-4 provides a circuit through contacts E-4" and through the magnetic starter coil MSe, the energization of which starter coil closes the motor switch for starting the operation of the electric motor 142e.

(c) When the switch tongue returns to the straight through position, the contacts E-4" of switch E-4 break the circuit through the magnetic starter coil MSe, the deenergization of which starter coil stops the electric motor 142e whereupon the cycle is completed.

The exit or readiness switch E-5 senses the presence of a load carrier LC in the storage line in readiness awaiting entry to the main line. If no load carrier is present, this exit switch E-5 blocks the circuit, thereby eliminating unnecessary operation of escapement switch H.

The following steps occur in the operational sequence of each escapement switch H:

(1) The first dog set 85, 86 on the pusher chain PC, either with or without a load carrier, actuates first tripping switch E-2 without causing any effect. However, the dog set 85, 86 actuates second tripping switch E-3, thereby setting up the control relay holding circuit.

(2) Any following dog set 85—86 on the pusher chain which is in the act of propelling a load carrier causes the following to take place: The load carrier actuates detecting switch E-1 thereby breaking the circuit to the control relay CR. This action drops first tripping switch E-2 out of the circuit and the dog set and the load carrier advance and then actuate first tripping switch E-2 with no results since this latter tripping switch is now out of the circuit. The dog set and load carrier continue to advance and actuate the second tripping switch E-3, thereby reenergizing the coil of control relay CR, placing first tripping switch E-2 back in the circuit.

(3) Any following dog set 85—86 on the propelling chain PC which is not in the act of propelling a load carrier produces the following chain of results: Since there is no load carrier immediately present, the detecting switch E-1 is not actuated and first tripping switch E-2 remains in the circuit. The dog set 85—86 advances and actuates first tripping switch E-2. Providing that a load carrier is in the storage line ready to enter the main line ML, i.e. maintaining exit switch E-5 closed, a circuit is set up as described in the steps recited below. (When the load carrier advances and actuates the second tripping switch E-3 it has no effect since the control relay CR is energized.)

(4) Tripping switches E-2 and E-5 set up a circuit, bypassing open contacts on track responsive switch E-4 through the magnetic starter coil MSe. The magnetic starter thereupon closes and places the motor 142e on the line. At the same time, a circuit is set up through the closed contacts of track responsive switch E-4 that energizes solenoid 186e.

(5) The motor 142e sets the driving disk 170e and the drive chain 141e into motion.

(6) Solenoid 186e actuates dog latch 182e, thereby releasing clutch dog 172e.

(7) Clutch dog spring 174e draws the clutch dog 172e into position to be engaged by one of the driving disk lugs 171e.

(8) Driving disk lug engages the clutch dog 172e and rotates the clutch dog and the attached throw bar 151e.

(9) The rotation of throw bar 151e operates through connecting rod 131e to draw the shiftable track tongue 101e, 102e toward the deflected or curved position.

(10) The travel of the track tongue toward curved position releases the plunger 215 of track responsive switch E-4, thereby reversing its contacts. Track responsive switch E-4 now maintains a circuit for the magnetic starter coil.

It should be noted at this juncture, that above recited steps 4 through 10 take place while the dog set 85—86 is holding tripping switch contacts E-2 closed.

(11) The driving disk 170e operates through the clutch dog 172e to rotate the throw bar 151e through 180°. The shiftable track tongue is thereby drawn to the curved position through the operation of the connecting rod 131e.

(12) As the throw bar 151e reaches the 180° position it drives the clutch dog 172e into dog latch 181e. This dog latch overcomes the clutch dog spring 174e and rotates the clutch dog lug out of contact with the driving lugs 171e on the driving disk 170e. This allows the driving disk to continue rotating, while the track tongue 101e, 102e remains at rest in the curved position.

(13) When the drive chain 141e carries the cam link 221 into operative position, this cam link raises the carrier stop arms 228. At the same time, a pusher pin 197e of drive pin link 196e engages the pusher bar 61 of the load carrier awaiting entrance into the escapement switch H. The cam link 221 lowers the carrier stop arms 228 behind the pusher bar 61 so as to prevent more than one load carrier entering the escapement switch. Before the load carrier reaches the shiftable switch tongue 101e—102e this tongue is in position to receive the carrier. The drive chain 141e pushes the carrier through the escapement switch and into the main line ML ahead of the dog set 85—86 that initiated the cycle. Thereupon, this dog set picks up the load carrier by the pusher bar 61 snapping under the hold back dog 86 and coming into driven abutment with the pusher dog 85.

(14) The drive chain 141e continues to travel through its loop, with the result that the drive pin link 196e actuates the restoring switch E-6, thereby initiating the return cycle.

(15) Restoring switch E-6 energizes solenoid 185e which trips dog latch 181e and thereby releases the clutch dog 172e.

(16) The clutch dog spring 174e draws the clutch dog 172e into position for engagement with the driving disk lug 171e.

(17) One of the driving disk lugs 171e engages the clutch dog 172e and rotates this clutch dog and the attached throw bar 151e.

(18) The rotation of throw bar 151e operates through the instrumentality of the connecting rod 131e to push the track toward straight through position.

(19) The driving disk 170e operating through the clutch dog 172e rotates the throw bar 151e through 180°, with the result that the track tongue 101e, 102e is shifted to the straight position through the operation of the connecting rod 131e.

(20) As the throw bar 151e reaches the 180° position, it drives the clutch dog 172e into dog latch 182e. This dog latch 182e overcomes the clutch dog spring and rotates the clutch dog out of contact with the associated driving lug 171e on the driving disk 170e. At the same time, through the thrust of the connecting rod 131e, the track tongue reaches the straight through position. As the track tongue reaches this straight position, it depresses the plunger 215 of track responsive switch E-4, returning the contacts thereof to the original position. This action breaks the circuit of the magnetic starter coil MSe, thereby taking the motor 142e off of the line and thus completing the cycle.

In FIGURES 20 and 21 we have shown a modified form of load carrier LC wherein the station selecting pins, designated 55a and 56a, can be readily adjusted for effecting different feed-in switch selections or different station selections. This is of particular use in an automatic dispatch system where it is necessary to route the carriers to more than one point. As an example, the operator can load any carrier, set the dials and delivery will be made to any particular station or area in the system. The selector pins 55a and 56a are mounted on duplicate rotatable discs 255 and 255' each having a hub or boss 256 welded thereto. The disc and hub are rotatably mounted on a tubular bushing 257 which is welded in an opening in the side arm 57' of U-shaped mounting stirrup 57. The disc and hub are retained on the tubular bushing 257 by a snap type of retaining ring 258 snapping into an annular groove in the outer end of the bushing 257. Formed in each disc 255, 255' is a ring of selector holes 259. Mounted in a hole in the stirrup side arm 57' is a retractable locking pin 261 which is normally projected outwardly through whichever one of the selector holes 259 is then in alignment with the selector locking pin 261. This selector locking pin is carried at its inner end on an upwardly extending arm 262 which is mounted at its lower end on a spring pressed plunger rod 263 passing axially through the tubular bushing 257. Mounted on the front end of the plunger rod 263 is a push button 265 which can be actuated from the outer side of the load carrier. Confined between the push button and the closed back end of the tubular bushing is a compression spring 266 which normally holds the push button 265 and locking pin 261 projected outwardly, with the locking pin engaging in one of the selector holes 259 in the selector disc. It will thus be seen that by merely depressing the push button 265, the selector disc can be rotated to present the associated selector pin 55a at any one of several different heights coded to different heights of the feed-in entrance switches F–1 and F–2; and that the left and right selector pins 55a and 56a can each be coded to a different height. The attachment of the stirrup bracket 57 to the carrier may be reinforced by a transverse bar 267 welded at its ends to the stirrup legs and secured by bolts 268 to the carrier bumper 39.

As previously described in connection with FIGURE 11, the coded entrance switches F–1 and F–2 can be set at different heights along the vertical bracket legs 201 for effecting different selector code settings of the particular coded entrance switch that they control. Each switch housing 203 is secured to a clamping plate 271 which is slidably mounted on the inner side of its associated bracket leg 201. Mounted on the outer side of the bracket leg is a corresponding clamping plate 272, and passing between these inner and outer clamping plates are a plurality of clamping bolts 273. By merely loosening these clamping bolts, the entrance switches F–1 and F–2 can be slid upwardly or downwardly to different heights along the bracket legs 201 for effecting different selective code settings of these switches. If desired, the stirrup bracket 202 can be adjustably bolted to the tracks LT and PT by a bolt 276 passing down between the tracks and having its lower head engaging in a clamping cross bar 277 engaging the under sides of the tracks. Also, if desired, each side leg 201 of the stirrup bracket may have a guide angle bar 279 welded to its inner surface, this guide bar having an upturned guide surface 279' at its leading end. These two angle guide bars lie just above the line of travel of the ends of the pusher bar 61 so as to insure that the pusher bar 61 and selector pins 55a, 55b will be level or horizontal when the coded entrance pins approach the selector switches F–1 and F–2.

In FIGURES 22–25 we have another modified embodiment of selector pin mounting, the pins in this embodiment being designated 55b and 56b and being movable up and down along vertical lines. Bolted to the outer side of each stirrup leg 57' by upper and lower bolts 281 is a guide bar 283 having a T-shaped guide slot 284 (FIG. 25) extending longitudinally in the outer surface thereof. Each selector pin has its inner end secured to a rectangular slide plate 285 which has vertically slidable mounting in the guide slot 284. The selector pin and its associated slide plate are releasably retained in any selected one of several vertical positions by a spring pressed ball detent 286 mounted in a main bore 287 in the slide plate and selector pin. Mounted in a counterbore 288 in the selector pin is a compression spring 289 which normally presses the ball 286 in an inward direction, for snapping into any selected one of a series of vertically spaced countersunk depressions 291 formed in the back surface of the T-shaped guide slot 284. In this embodiment the selector pins 55b and 56b are adjusted to different code settings by merely sliding them up or down into the vertically spaced positions defined by the countersunk depressions 291.

In FIGURES 26 and 27 we have shown still another selector pin mounting wherein the selector pins can be automatically reset to predetermined initial positions when the load carrier reaches a certain predetermined point in the system. In this embodiment a U-shaped frame 294 is welded or otherwise secured across the top of the load bar 35, and mounted in the depending side plate portions 294' of this frame are front and rear pivot bolts 295, 295'. Pivotally mounted on these bolts for vertical swinging movement between the side plate portions are U-shaped frames 296, 296'. Punched out in each side plate portion 294' are arcuate front and rear slots 297, 297' which are curved concentrically of the front and rear pivot bolts 295, 295'. Mounted in notched ends of the open side arms of the swinging U-shaped frame 296, 296' are the selector pins, designated 55c and 56c in this embodiment. Tension springs 298, 298' are connected between the selector pins and the upper transverse portion of the U-shaped frame 294, these springs normally tending to swing the selector pins 55c and 56c up to the upper ends of the arcuate slots 297, 297'. The shanks of these selector pins project entirely across the assembly and through the arcuate slots in the opposite side plate portion, having a short end 55c' and 56c' projecting slightly beyond this opposite side plate portion. This enables an operator to see from one side of the carrier the positions of both selector pins.

The selector pins are adapted to be held in any one of numerous angularly spaced points along the lengths of the arcuate slots by toothed detent segments 301, 301' which are disposed inside the side plate portions 294' and are pivotally mounted near their upper ends on pivot bolts 302, 302' projecting inwardly from the side plate portions 294'. These detent segments have oppositely facing arcuate surfaces in which are formed notches 304, 304' adapted to engage over the transversely extending shanks of the selector pins 55c and 56c. Horizontal tension springs 306 connect the lower ends of the toothed segments for normally holding the notches 304, 304' in the segments pressed inwardly against the selector pins, whereby the pins are retained at their desired selected heights in the arcuate slots 297—297'. Handle extensions 307, 307' project downwardly from the lower ends of the notched segments, whereby the segments can be readily swung manually out to their releasing positions when it is desired to restore the selector pins to their normal upper positions, or when it is desired to move one of the selector pins to a higher position. The notches 304 and 304' have a downward slope so that the operator can set either of the selector pins into a lower position by merely pulling downwardly thereon.

Formed at the upper end of each notched segment 301, 301' is an automatic deflecting tail or arm 308, 308' having sloping cam surfaces. When the carrier arrives at that point in the track at which it is desired to automatically restore the selector pins back to their normal raised positions, the deflecting arms 308, 308' pass under a tripping rail having a sloping leading end, thereby exerting a cam action on both deflecting arms 308, 308' to permit the selector pins to snap up to their normal elevated positions.

In FIGURE 28 we have shown diagrammatically the booster-retarder device BR, which is to be used primarily on gravity flow lines. Its purpose is to arrest the speed of the load carrier without stopping it entirely. It comprises pairs of parallel large diameter rubber discs 311 which are adapted to have their peripheries make contact with the pusher bar 61 as each load carrier passes underneath. As this contact is made, the pusher bar deforms the resilient periphery of the rubber disc as the carrier moves past, as indicated by the deformed area 311' in FIGURE 28. These large rubber discs 311 are mounted in pairs on a cross shaft 312 journaled in a frame 314 mounted on the top of the load track LT of a branch storage line B, C, D, etc., as shown in FIGURE 1. The pairs of rubber discs engage the oppositely projecting arms of each pusher bar 61 substantially simultaneously. When this contact takes place, the load carrier is slowed down or speeded up to the velocity of the rubber discs 311. The shaft 312 is driven by a chain drive from a speed reducing gear unit which is in turn driven by an electric motor 315. The rotative speed of the rubber discs 311 can be proportioned either to slow down or to speed up the gravitational travel of the carriers LC along the branch line load track LT. There may be more than one of these booster-retarder units BR at spaced intervals along the length of a long branch line.

In FIGURE 29 we have illustrated diagrammatically one embodiment of full line sensing device E. It is so called because it indicates whether a load track is full of carriers. This indication may be made manifest on a panel board by signal lights; as for example red for full and green for not full. However, what is probably a more important function of this sensing device is its ability to block out or kill the control circuit of the feed-in switch F associated with that particular storage line. Thus, the sensing device E prevents jamming with resultant injury if it is attempted to force more load carriers into a completely filled branch line. The device comprises two spaced pivoted sectors or triangles 320 and 321 which are pivotally mounted to hang down alongside the branch line load track LT, normally in the full line positions where they will be engaged by the pusher bars 61 of the load carriers and swung into the dotted line positions. When the branch track is filled, both fingers or triangles 320 and 321 are in their dotted line positions, at which time they open their respective control switches 320' and 321' and thus disconnect or kill the circuit of the associated feed-in track switch so that no more load carriers enter this branch track, as illustrated in the circuit diagram of FIGURE 30. It will be noted that the two switches 320' and 321' are connected in parallel. FIGURE 13 illustrates how these two switches 320' and 321' control the circuit of the feed-in track switch G. The bottom bar of each swinging triangle 320 and 321 is made long enough to span one carrier load bar length. This is done to prevent a carrier from stopping just in front of just behind the triangle, thereby causing a false indication. It will also be noted that there is room for one carrier between 320 and 321, which further prevents a false alarm.

While we have illustrated and described what we regard to be the preferred embodiments of our invention, nevertheless it will be understood that such are merely exemplary and that numerous modifications and rearrangements may be made therein without departing from the essence of the invention.

We claim:

1. In an overhead conveyor system, a main load track and a power track disposed side by side in a common horizontal plane, load carriers travelling on said main load track, a pusher chain travelling along said power track, cooperating means carried by said carriers and said chain effective for propelling said carriers along said load track, a branch track, a track switch for switching said carriers from said main load track to said branch track, said switch comprising tongue means movable between switching and non-switching positions and normally in non-switching position aligned with said load track, switch operating power means disposed approximately in the plane of said tracks and operable independently of said pusher chain effective for moving said tongue means from its said normal position to switching position and moving a carrier from said main track onto said branch track and thereafter returning said tongue means to normal position, control means responsive to a carrier on said main load track approaching said switch and intended for entering said branch track and effective for actuating said switch operating power means for moving said tongue means to switching position and moving the approaching carrier from said main track onto said branch track and thereafter returning said tongue means to normal position, said switch operating power means comprising a rotatable crank member, a normally stationary closed loop drive chain operable independently of said pusher chain, and a single normally deenergized electric motor operatively connected to drive said rotatable crank member and to propel said drive chain, said motor being energized responsive to actuation of said carrier responsive control means, means responsive to one-half of a revolution of said rotatable crank member to shift said tongue means to switching position and responsive to the other half revolution to return said tongue means back to normal position, and means responsive to operation of said drive chain effective to propel load carriers through said track switch.

2. In an overhead conveyor system, a main load track, load carriers traveling on said load track, a continuously operating pusher chain for propelling carriers along said main load track, a branch track, a track switch for switching carriers from said main load track to said branch track, said switch comprising tongue means movable between switching and non-switching positions and normally in non-switching position aligned with said load track, switch operating power means overlying said tracks in proximity and substantially parallel relation thereto and operable independently of said pusher chain and effective for moving said tongue means form its said normal position to switching position and moving a carrier from said main track onto said branch track and thereafter returning said tongue means to normal position, control means responsive to an approaching carrier on said main track and intended for entering said branch track for actuating said switch operating power means for moving said tongue means to switching position and moving the approaching carrier from said main track onto said branch track and thereafter returning said tongue means to normal position, said switch power operating means comprising a normally stationary closed loop drive chain operable independently of said pusher chain, a normally deenergized electric motor operatively connected to propel said drive chain and to operate said track switch and energized responsive to actuation of said carrier responsive control means, said motor when energized being effective for moving said switch tongue means to switching position and driving said drive chain, and means operative responsive to operation of said loop drive chain effective for propelling a carrier through said track switch.

3. In an overhead conveyor system, a main load track, load carriers traveling on said load track, a pusher chain operating along said main load track for propelling carriers along said track, a branch track, a track switch for switching carriers from said load track to said branch track, said switch comprising tongue means movable between switching and non-switching positions and normally in non-switching position aligned with said load track, operating power means operable independently of said pusher chain, and control means responsive to a carrier on said main load track approaching said switch intended for enternig said branch track and effective for actuating said operating power means for moving said tongue means to switching position and including means for moving the approaching carrier from said main track onto said branch track and thereafter returning said tongue means to normal position, said operating power means comprising normally inactive carrier propelling means and switch operating means both independent of said pusher chain and rendered operative responsive to actuation of said carrier responsive control means and when so rendered operative effective for moving said switch tongue means to switching position and propelling the load carrier throughout substantially the length of said track switch independently of the propelling force of said pusher chain and after the load carrier has been switched from the main load track to the track switch and separated from the propelling influence of said pusher chain operating along said main load track.

References Cited in the file of this patent

UNITED STATES PATENTS

| | | |
|---|---|---|
| 301,119 | Haskins et al. | July 1, 1884 |
| 1,149,763 | Herzinger | Aug. 10, 1915 |
| 1,243,457 | Stuart | Oct. 16, 1917 |
| 1,625,501 | Robertson | Apr. 19, 1927 |
| 1,888,911 | De Graffenreid | Nov. 22, 1932 |
| 2,201,013 | Rosenthal | May 14, 1940 |
| 2,527,244 | Culver | Oct. 24, 1950 |
| 2,684,039 | King | July 20, 1954 |
| 2,741,190 | King | Apr. 10, 1956 |
| 2,803,333 | Freeman | Aug. 20, 1957 |
| 2,868,138 | Bishop et al. | Jan. 13, 1959 |
| 2,868,139 | Klamp | Jan. 13, 1959 |